US011557223B2

(12) United States Patent
Bronstrup et al.

(10) Patent No.: US 11,557,223 B2
(45) Date of Patent: Jan. 17, 2023

(54) MODULAR AND RECONFIGURABLE CHASSIS FOR SIMULATED WELDING TRAINING

(71) Applicant: Lincoln Global, Inc., Santa Fe Springs, CA (US)

(72) Inventors: John T. Bronstrup, Brecksville, OH (US); Jason A. Scales, Perry, OH (US); Brian Meess, Cleveland, OH (US); Andrew S. Shamrock, Willoughby, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 196 days.

(21) Appl. No.: 16/366,378

(22) Filed: Mar. 27, 2019

(65) Prior Publication Data
US 2019/0325784 A1 Oct. 24, 2019

Related U.S. Application Data

(60) Provisional application No. 62/659,729, filed on Apr. 19, 2018.

(51) Int. Cl.
*G09B 19/24* (2006.01)
*G09B 9/00* (2006.01)
*G09B 19/00* (2006.01)

(52) U.S. Cl.
CPC ............. *G09B 19/24* (2013.01); *G09B 9/00* (2013.01); *G09B 19/003* (2013.01)

(58) Field of Classification Search
CPC .......... G09B 19/24; G09B 9/00; G09B 19/00; G09B 19/003
See application file for complete search history.

(56) References Cited

U.S. PATENT DOCUMENTS

| 317,063 | A | 5/1885 | Wittenstrom |
| 428,459 | A | 5/1890 | Coffin |
| 483,428 | A | 9/1892 | Goppin |
| 1,159,119 | A | 11/1915 | Springer |
| 1,286,529 | A | 12/1918 | Cave |
| 2,326,944 | A | 8/1943 | Holand et al. |

(Continued)

FOREIGN PATENT DOCUMENTS

| CA | 2698078 | 9/2011 |
| CN | 1665633 | 9/2005 |

(Continued)

OTHER PUBLICATIONS

Collins (Lecture 4:Smoothing) (downloaded from: https://web.archive.org/web/20150616212349/http://www.cse.psu.edu/- rtc12/CSE486/lecture04.pdf) (Year: 2015).

(Continued)

*Primary Examiner* — Timothy A Musselman
(74) *Attorney, Agent, or Firm* — Calfee, Halter & Griswold LLP; Brad C. Spencer

(57) ABSTRACT

A modular and reconfigurable chassis enables minimalization of inventory while facilitating ease of conversion into multiple configurations of a welding simulator. The modular and reconfigurable chassis permits both hardware and software related system configurations. The chassis is adapted to receive hardware interfaces for single and multiple user configurations.

13 Claims, 10 Drawing Sheets

(56) References Cited

U.S. PATENT DOCUMENTS

| | | |
|---|---|---|
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson et al. |
| 3,654,421 A | 4/1972 | Streetman et al. |
| 3,690,020 A | 9/1972 | Mcbratnie |
| 3,739,140 A | 6/1973 | Rotilio |
| 3,852,917 A | 12/1974 | Mckown |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,354,087 A | 10/1982 | Osterlitz |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Traadt |
| 4,452,589 A | 6/1984 | Denison |
| D275,292 S | 8/1984 | Bouman |
| D277,761 S | 2/1985 | Korovin et al. |
| 4,525,619 A | 6/1985 | Ide et al. |
| D280,329 S | 8/1985 | Bouman |
| 4,555,614 A | 11/1985 | Morris et al. |
| 4,611,111 A | 9/1986 | Baheti et al. |
| 4,616,326 A | 10/1986 | Meier et al. |
| 4,629,860 A | 12/1986 | Lindborn |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,973,814 A | 11/1990 | Kojima |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil et al. |
| 5,547,052 A | 8/1996 | Latshaw |
| 5,562,843 A | 10/1996 | Yasumoto |
| 5,662,822 A | 9/1997 | Tada et al. |
| 5,670,071 A | 9/1997 | Tomoyuki et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,296 S | 6/1998 | Kaya et al. |
| 5,774,110 A | 6/1998 | Edelson |
| D396,238 S | 7/1998 | Schmitt |
| 5,781,258 A | 7/1998 | Debral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,877,777 A | 3/1999 | Colwell |
| 5,963,891 A | 10/1999 | Walker et al. |
| 6,008,470 A | 12/1999 | Zhang et al. |
| 6,037,948 A | 3/2000 | Liepa |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne et al. |
| 6,236,017 B1 | 5/2001 | Smartt et al. |
| 6,242,711 B1 | 6/2001 | Cooper |
| 6,271,500 B1 | 8/2001 | Hirayam et al. |
| 6,301,763 B1 | 10/2001 | Pryor |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker |
| 6,621,049 B2 | 9/2003 | Suzuki |
| 6,624,388 B1 | 9/2003 | Blankenship |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,679,702 B1 | 1/2004 | Rau |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |

(56) References Cited

U.S. PATENT DOCUMENTS

| | | |
|---|---|---|
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Matthias |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,024,342 B1 | 4/2006 | Waite |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey |
| 7,225,414 B1 | 5/2007 | Sharma et al. |
| 7,233,837 B2 | 6/2007 | Swain et al. |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | Lemay et al. |
| 7,474,760 B2 | 1/2009 | Hertzman et al. |
| 7,478,108 B2 | 1/2009 | Townsend et al. |
| D587,975 S | 3/2009 | Aronson et al. |
| 7,487,018 B2 | 4/2009 | Lee et al. |
| 7,516,022 B2 | 4/2009 | Lee et al. |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,301,286 B2 | 10/2012 | Babu |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 | 7/2014 | Kreindl et al. |
| 8,787,051 B2 | 7/2014 | Chang et al. |
| 8,834,168 B2 | 9/2014 | Peters et al. |
| 8,851,896 B2 | 10/2014 | Wallace et al. |
| 8,911,237 B2 | 12/2014 | Postlethwaite et al. |
| 8,915,740 B2 | 12/2014 | Zboray et al. |
| RE45,398 E | 3/2015 | Wallace |
| 8,992,226 B1 | 3/2015 | Leach et al. |
| 9,011,154 B2 | 4/2015 | Dig et al. |
| 9,293,056 B2 | 3/2016 | Zboray et al. |
| 9,293,057 B2 | 3/2016 | Zboray et al. |
| 9,740,412 B2 | 8/2017 | Jung et al. |
| 9,779,635 B2 | 10/2017 | Zboray et al. |
| 9,836,987 B2 | 12/2017 | Postlethwaite et al. |
| 2001/0045808 A1 | 11/2001 | Heitmann et al. |
| 2001/0052893 A1 | 12/2001 | Jolly et al. |
| 2002/0032553 A1 | 3/2002 | Simpson et al. |
| 2002/0039138 A1 | 4/2002 | Edelson et al. |
| 2002/0046999 A1 | 4/2002 | Veikkolainen et al. |
| 2002/0005421 A1 | 5/2002 | Edelson et al. |
| 2002/0050984 A1 | 5/2002 | Roberts |
| 2002/0085843 A1 | 7/2002 | Mann |
| 2002/0094026 A1 | 7/2002 | Edelson et al. |
| 2002/0098468 A1 | 7/2002 | Barrett et al. |
| 2002/0111557 A1 | 8/2002 | Madill et al. |
| 2002/0132213 A1 | 9/2002 | Grant et al. |
| 2002/0135695 A1 | 9/2002 | Edelson et al. |
| 2002/0175897 A1 | 11/2002 | Pelosi |
| 2002/0178038 A1 | 11/2002 | Grybas |
| 2002/0180761 A1 | 12/2002 | Edelson |
| 2003/0000931 A1 | 1/2003 | Ueda |
| 2003/0002740 A1 | 1/2003 | Melikian |
| 2003/0023592 A1 | 1/2003 | Modica et al. |
| 2003/0025884 A1 | 2/2003 | Hamana et al. |
| 2003/0062354 A1 | 4/2003 | Ward |
| 2003/0075534 A1 | 4/2003 | Okamoto |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0186199 A1 | 10/2003 | McCool et al. |
| 2003/0228560 A1 | 12/2003 | Seat et al. |
| 2003/0234885 A1 | 12/2003 | Pilu |
| 2004/0009462 A1 | 1/2004 | McElwrath |
| 2004/0020907 A1 | 2/2004 | Zauner et al. |
| 2004/0035990 A1 | 2/2004 | Ackeret |
| 2004/0050824 A1 | 3/2004 | Samler |
| 2004/0082373 A1 | 4/2004 | Cole et al. |
| 2004/0088071 A1 | 5/2004 | Kouno |
| 2004/0140301 A1 | 7/2004 | Blankenship et al. |
| 2004/0167788 A1 | 8/2004 | Birimisa et al. |
| 2004/0181382 A1 | 9/2004 | Hu |
| 2005/0007504 A1 | 1/2005 | Fergason |
| 2005/0017152 A1 | 1/2005 | Fergason |
| 2005/0029326 A1 | 2/2005 | Henrikson |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0103768 A1* | 5/2005 | Ward .................. B23K 9/167 219/137.71 |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0163364 A1 | 7/2005 | Beck |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0233295 A1 | 10/2005 | Chiszar et al. |
| 2005/0252897 A1 | 11/2005 | Hsu et al. |
| 2005/0255914 A1 | 11/2005 | McHale et al. |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0076321 A1 | 4/2006 | Maev |
| 2006/0136183 A1 | 6/2006 | Choquet |
| 2006/0140502 A1 | 6/2006 | Tseng et al. |

(56) References Cited

U.S. PATENT DOCUMENTS

| | | |
|---|---|---|
| 2006/0154226 A1 | 7/2006 | Maxfield |
| 2006/0163227 A1 | 7/2006 | Hillen et al. |
| 2006/0163228 A1 | 7/2006 | Daniel |
| 2006/0166174 A1 | 7/2006 | Rowe |
| 2006/0169682 A1 | 8/2006 | Kainec et al. |
| 2006/0173619 A1 | 8/2006 | Brant et al. |
| 2006/0183083 A1 | 8/2006 | Moran et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0241432 A1 | 10/2006 | Herline et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0060359 A1 | 3/2007 | Smith |
| 2007/0088536 A1 | 4/2007 | Ishikawa |
| 2007/0112889 A1 | 5/2007 | Cook et al. |
| 2007/0164007 A1 | 7/2007 | Peters et al. |
| 2007/0188606 A1 | 8/2007 | Atkinson et al. |
| 2007/0198117 A1 | 8/2007 | Wajihuddin |
| 2007/0211026 A1 | 9/2007 | Ohta et al. |
| 2007/0221797 A1 | 9/2007 | Thompson et al. |
| 2007/0256503 A1 | 11/2007 | Wong et al. |
| 2007/0264620 A1 | 11/2007 | Maddix et al. |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0027594 A1 | 1/2008 | Jump et al. |
| 2008/0031774 A1 | 2/2008 | Magnant et al. |
| 2008/0037218 A1* | 2/2008 | Sharma .............. H05K 7/1424 361/695 |
| 2008/0038702 A1 | 2/2008 | Choquet |
| 2008/0061049 A1 | 3/2008 | Albrecht |
| 2008/0078811 A1 | 4/2008 | Hillen et al. |
| 2008/0078812 A1 | 4/2008 | Peters et al. |
| 2008/0107345 A1 | 5/2008 | Melikian |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0249998 A1 | 10/2008 | Dettinger et al. |
| 2008/0303197 A1 | 12/2008 | Paquette et al. |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0050612 A1 | 2/2009 | Serruys et al. |
| 2009/0057286 A1 | 3/2009 | Ihara et al. |
| 2009/0109128 A1 | 4/2009 | Nangle |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0197228 A1 | 8/2009 | Afshar et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0257655 A1 | 10/2009 | Melikian |
| 2009/0259444 A1 | 10/2009 | Dolansky |
| 2009/0298024 A1 | 12/2009 | Batzler et al. |
| 2009/0312958 A1 | 12/2009 | Dai et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper |
| 2010/0279771 A1* | 11/2010 | Block .................. A63F 13/98 463/37 |
| 2010/0299101 A1 | 11/2010 | Shimada et al. |
| 2010/0307249 A1 | 12/2010 | Lesage et al. |
| 2010/0314362 A1 | 12/2010 | Albrecht |
| 2010/0326962 A1 | 12/2010 | Calla et al. |
| 2011/0006047 A1 | 1/2011 | Penrod |
| 2011/0048273 A1 | 3/2011 | Colon |
| 2011/0052046 A1 | 3/2011 | Melikian |
| 2011/0060568 A1 | 3/2011 | Goldfine |
| 2011/0062132 A1 | 3/2011 | Raje et al. |
| 2011/0082728 A1 | 4/2011 | Melikian |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy |
| 2011/0122495 A1 | 5/2011 | Togashi |
| 2011/0183304 A1 | 7/2011 | Wallace et al. |
| 2011/0187746 A1 | 8/2011 | Suto |
| 2011/0187859 A1 | 8/2011 | Edelson |
| 2011/0218024 A1* | 9/2011 | Baerlocher ......... G07F 17/3295 463/16 |
| 2011/0229864 A1 | 9/2011 | Short et al. |
| 2011/0248864 A1 | 10/2011 | Becker |
| 2011/0316516 A1 | 12/2011 | Schiefermuller et al. |
| 2012/0029674 A1 | 2/2012 | Hida |
| 2012/0122062 A1 | 5/2012 | Yang et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0119040 A1 | 5/2013 | Suraba et al. |
| 2013/0170259 A1 | 7/2013 | Chang et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0198334 A1 | 8/2013 | Ikenaga et al. |
| 2013/0203029 A1 | 8/2013 | Choquet |
| 2013/0206740 A1 | 8/2013 | Pfeifer et al. |
| 2013/0209976 A1 | 8/2013 | Postlethwaite et al. |
| 2013/0230832 A1 | 9/2013 | Peters et al. |
| 2013/0231980 A1 | 9/2013 | Choquet |
| 2013/0252214 A1 | 9/2013 | Eigart et al. |
| 2013/0288211 A1 | 10/2013 | Patterson et al. |
| 2013/0295535 A1 | 11/2013 | Levy et al. |
| 2013/0327747 A1 | 12/2013 | Dantinne |
| 2013/0342678 A1 | 12/2013 | McAninch et al. |
| 2014/0017642 A1 | 1/2014 | Postlethwaite et al. |
| 2014/0038143 A1 | 2/2014 | Daniel |
| 2014/0042136 A1 | 2/2014 | Daniel |
| 2014/0065584 A1 | 3/2014 | Wallace et al. |
| 2014/0134580 A1 | 5/2014 | Becker |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056575 A1 | 2/2015 | Boulware et al. |
| 2015/0056585 A1 | 2/2015 | Boulware et al. |
| 2015/0056586 A1 | 2/2015 | Penrod |
| 2015/0072323 A1* | 3/2015 | Postlethwaite ......... G09B 5/00 434/234 |
| 2015/0125836 A1 | 5/2015 | Daniel |
| 2015/0194072 A1 | 7/2015 | Becker et al. |
| 2015/0194073 A1 | 7/2015 | Becker et al. |

(56) References Cited

U.S. PATENT DOCUMENTS

| | | |
|---|---|---|
| 2015/0235565 A1 | 8/2015 | Postlethwaite et al. |
| 2015/0248846 A1 | 9/2015 | Postlethwaite et al. |
| 2015/0262511 A1 | 9/2015 | Lin et al. |
| 2016/0049085 A1 | 2/2016 | Beeson |
| 2016/0093233 A1 | 3/2016 | Boulware et al. |
| 2016/0125594 A1 | 5/2016 | Becker et al. |
| 2016/0125763 A1 | 5/2016 | Becker |
| 2016/0203734 A1 | 7/2016 | Boulware et al. |
| 2016/0203735 A1 | 7/2016 | Boulware et al. |
| 2016/0260261 A1 | 9/2016 | Hsu |
| 2016/0331592 A1 | 11/2016 | Stewart |
| 2016/0343268 A1 | 11/2016 | Postlethwaite et al. |
| 2017/0046977 A1* | 2/2017 | Becker ................ G09B 19/003 |
| 2017/0053557 A1 | 2/2017 | Daniel |
| 2017/0200384 A1* | 7/2017 | Albrecht .............. G09B 19/24 |

FOREIGN PATENT DOCUMENTS

| | | |
|---|---|---|
| CN | 201083660 Y | 7/2008 |
| CN | 201149744 | 11/2008 |
| CN | 101406978 | 4/2009 |
| CN | 101419755 A1 | 4/2009 |
| CN | 201229711 Y | 4/2009 |
| CN | 101571887 A | 11/2009 |
| CN | 101587659 A | 11/2009 |
| CN | 101661589 | 3/2010 |
| CN | 102053563 | 5/2011 |
| CN | 102202836 | 9/2011 |
| CN | 202053009 | 11/2011 |
| CN | 202684308 U | 1/2013 |
| CN | 203503228 | 3/2014 |
| CN | 103871279 A | 6/2014 |
| CN | 104798116 A | 7/2015 |
| CN | 204470766 U | 7/2015 |
| CN | 205920627 U | 2/2017 |
| CN | 106774949 A | 5/2017 |
| CN | 206946745 U | 1/2018 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 102006048165 | 1/2008 |
| DE | 10 2010 038 902 A1 | 2/2012 |
| DE | 202012013151 U1 | 2/2015 |
| EP | 0008527 | 1/1982 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| FR | 1456780 | 3/1965 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | H07214317 A | 8/1995 |
| JP | 07-232270 | 9/1995 |
| JP | 08-505091 | 4/1996 |
| JP | 08-150476 | 6/1996 |
| JP | 08221107 | 8/1996 |
| JP | 08-132274 | 5/1998 |
| JP | H1133963 A | 2/1999 |
| JP | 2000-167666 A | 6/2000 |
| JP | 2000-237872 | 9/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2004025270 | 1/2004 |
| JP | 2006-006604 A | 1/2006 |
| JP | 2006175205 | 7/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2010-225129 | 10/2010 |
| JP | 2010231792 | 10/2010 |
| JP | 2012024867 A | 2/2012 |
| JP | 2012218058 A | 11/2012 |
| KR | 100876425 | 12/2008 |
| KR | 20090010693 | 1/2009 |
| KR | 1020090111556 A | 10/2009 |
| KR | 20110068544 | 6/2011 |
| NO | 0112376 A1 | 2/2001 |
| RU | 527045 | 7/1995 |
| RU | 2317183 | 2/2008 |
| RU | 2008 108 601 C1 | 11/2009 |
| SU | 1038963 A1 | 8/1983 |
| WO | 98/45078 | 10/1998 |
| WO | 01/43910 | 6/2001 |
| WO | 0158400 A1 | 8/2001 |
| WO | 2004029549 | 4/2004 |
| WO | 2005102230 A1 | 11/2005 |
| WO | 2005110658 | 11/2005 |
| WO | 2006034571 A1 | 4/2006 |
| WO | 2007009131 | 1/2007 |
| WO | 2007039278 | 4/2007 |
| WO | 2009120921 | 1/2009 |
| WO | 2009060231 A1 | 5/2009 |
| WO | 2010020867 | 8/2009 |
| WO | 2009149740 A1 | 12/2009 |
| WO | 2010000003 A2 | 1/2010 |
| WO | 2010020870 | 2/2010 |
| WO | 2010044982 | 4/2010 |
| WO | 2010091493 A1 | 8/2010 |
| WO | 2011017608 A1 | 2/2011 |
| WO | 2011041037 A1 | 4/2011 |
| WO | 2011045654 A1 | 4/2011 |
| WO | 2011058433 | 5/2011 |
| WO | 2011059502 | 5/2011 |
| WO | 2011060350 A1 | 5/2011 |
| WO | 2011067447 A1 | 6/2011 |
| WO | 2011088412 A1 | 7/2011 |
| WO | 2011097035 A2 | 8/2011 |
| WO | 2011150165 A1 | 12/2011 |
| WO | 2012016851 | 2/2012 |
| WO | 2012082105 A1 | 6/2012 |
| WO | 2012137060 A1 | 10/2012 |
| WO | 2012143327 A1 | 10/2012 |
| WO | 2013014202 A1 | 1/2013 |
| WO | 2013-025672 | 2/2013 |
| WO | 2013061518 | 5/2013 |
| WO | 2013098567 A1 | 7/2013 |
| WO | 2013114189 A1 | 8/2013 |
| WO | 2013119749 | 8/2013 |
| WO | 2013175079 A1 | 11/2013 |
| WO | 2013186413 | 12/2013 |
| WO | 2014007830 A1 | 1/2014 |
| WO | 2014019045 A1 | 2/2014 |
| WO | 2014020386 | 2/2014 |
| WO | 2014140720 | 9/2014 |
| WO | 2014184710 | 11/2014 |
| WO | 2016-137578 | 9/2016 |

OTHER PUBLICATIONS

IT Media, "Tokyo Game Show 2008: Games aren't just about entertainment," published Oct. 9, 2008.

(56) References Cited

OTHER PUBLICATIONS

Russell and Norvig, "Artificial Intelligence: A Modem Approach", Prentice-Hall (Copyright 1995).

Mechanisms and Mechanical Devices Source Book, Chironis, Neil Sclater, McGraw Hill; 2nd Addition, 1996.

Exhibit B from Declaration of Morgan Lincoln in *Lincoln Electric Co et al.* v. *Seabery Soluciones, S.L et al.*, Case No. 1:15-cv-01575-DCN, dated Dec. 20, 2016, 5 pages.

Bender Shipbuilding and Repair Co. Virtual Welding—A Low Cost Virtual Reality Welding Training System. Proposal submitted pursuant to MSRP Advanced Shipbuilding Enterprise Research Announcement, Jan. 23, 2008. 28 pages, See also, http://www.nsrp.org/6-PresentationsM/D/020409 Virtual Welding Wilbur.pdf.

Aiteanu, Dorian; and Graser, Axel. "Generation and Rendering of a Virtual Welding Seam in an Augmented Reality Training Environment." Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.

Tschirner, Petra; Hillers, Bernd; and Graser, Axel "A Concept for the Application of Augmented Reality in Manual Gas Metal Arc Welding." Proceedings of the International Symposium on Mixed and Augmented Reality; 2 pages; 2002.

Penrod, Matt. "New Welder Training Tools." EWI PowerPoint presentation; 16 pages; allegedly 2008.

Fite-Georgel, Pierre. Is there a Reality in Industrial Augmented Reality? 10th IEEE International Symposium on Mixed and Augmented Reality (ISMAR). 10 pages, allegedly 2011.

Hillers, B.; Graser, A. "Real time Arc-Welding Video Observation System." 62nd International Conference of IIW, Jul. 12-17, 2009, 5 pages, allegedly Singapore 2009.

Advance Program of American Welding Society Programs and Events. Nov. 11-14, 2007. 31 pages. Chicago.

TEREBES: examples from http://www.terebes.uni-bremen.de.; 6 pages.

Sandor, Christian; Gudrun Klinker. "PAARTI: Development of an Intelligent Welding Gun for BMW." PIA2003, 7 pages, Tokyo. 2003.

ARVIKA Forum Vorstellung Projekt PAARI. BMW Group Virtual Reality Center. 4 pages. Nuermberg. 2003.

Sandor, Christian; Klinker, Gudrun. "Lessons Learned in Designing Ubiquitous Augmented Reality User Interfaces." 21 gages, allegedly from Emerging Technologies of Augmented Reality: Interfaces Eds. Haller, M.; Billinghurst, M.; Thomas, B. Idea Group Inc. 2006.

Impact Welding: examples from current and archived website, trade shows, etc. See, e.g., http://www.impactwelding.com. 53 pages.

Http://www.nsrp.org/6-Presentations/WDVirtual_Welder.pdf (Virtual Reality Welder Training, Project No. SI051, Navy ManTech Program, Project Review for ShipTech 2005); 22 pages. Biloxi, MS.

Https://app.aws_org/w/r/www/wj/2005/031 WJ_2005_03.pdf (AWS Welding Journal, Mar. 2005 (see, e.g., p. 54)).; 114 pages.

Https://app.aws.org/conferences/defense/live index.html (AWS Welding in the Defense Industry conference schedule, 2004); 12 pages.

Https://app.aws.org/wj/2004/04/052/njc (AWS Virtual Reality Program to Train Welders for Shipbuilding, workshop Information, 2004); 7 pages.

Https://app.aws.org/wj/2007/11WJ200711.pdf (AWS Welding Journal, Nov. 2007); 240 pages.

American Welding Society, "Vision for Welding Industry;" 41 pages.

Energetics, Inc. "Welding Technology Roadmap," Sep. 2000, 38 pages.

Aiteanu, Dorian; and Graser, Axel. Computer-Aided Manual Welding Using an Augmented Reality Supervisor Sheet Metal Welding Conference XII, Livonia, MI, May 9-12, 2006, 14 pages.

Hillers, Bernd; Aiteanu, Dorin and Graser, Axel "Augmented Reality—Helmet for the Manual Welding Process," Institute of Automation, University of Bremen, Germany; 21 pages.

Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003; 2 pages.

ArcSentry Weld Quality Monitoring System; Native American Technologies, allegedly 2002, 5 pages.

P/NA.3 Process Modelling and Optimization; Native American Technologies, allegedly 2002, 5 pages.

B. Hillers, D. Aitenau, P. Tschimer, M. Park, A. Graser, B. Balazs, L. Schmidt, "TEREBES: Welding Helmet with AR Capabilities", Institute of Automatic University Bremen; Institute of Industrial Engineering and Ergonomics, 10 pages, allegedly 2004.

Sheet Metal Welding Conference Xlr, American Welding Society Detroit Section, May 2006, 11 pages.

Kenneth Fast, Timothy Gifford, Robert Yancey, "Virtual Training for Welding", Proceedings of the Third IEEE and ACM International Symposium on Mixed and Augmented Reality (ISMAR 2004); 2 pages.

Amended Answer to Complaint with Exhibit A for Patent Infringement filed by Seabery North America Inc. in *Lincoln Electric Co et al.* v. *Seabery Soluciones, S.L. et al.*, Case No. 1:15-cv-01575-DCN, docket No. 44, filed Mar. 1, 2016, in the U.S. District Court for the Northern District of Ohio; 19 pages.

Amended Answer to Complaint with Exhibit A for Patent Infringement filed by Seabery Soluciones SL in *Lincoln Electric Co et al.* v. *Seabery Soluciones, S.L_ et al.*, Case No. 1:15-cv-01575-DCN, docket No. 45, filed Mar. 1, 2016 in the U.S. District Court for the Northern District of Ohio; 19 pages.

Reply to Amended Answer to Complaint for Patent Infringement filed by Lincoln Electric Company; Lincoln Global, Inc. in *Lincoln Electric Co. et al.* v. *Seabery Soluciones, S.L. et al.*, Case No. 1:15-cv-01575-DCN; docket No. 46, filed Mar. 22, 2016; 5 pages.

Answer for Patent Infringement filed by Lincoln Electric Company, Lincoln Global, Inc. in *Lincoln Electric Co. et al.* v. *Seabery Soluciones, S.L. et al.*, Case No. 1:15-cv-01575-DCN; docket No. 47, filed Mar. 22, 2016; 5 pages.

Petition for Inter Partes Review of U.S. Pat. No. 8,747,116; IPR 2016-00749; Apr. 7, 2016; 70 pages.

Petition for Inter Partes Review of U.S. Pat. No. RE45,398; IPR 2016-00840; Apr. 18, 2016; 71 pages.

Petition for Inter Partes Review of U.S. Pat. No. 9,293,056; IPR 2016-00904; May 9, 2016; 91 pages.

Petition for Inter Partes Review of U.S. Pat. No. 9,293,057; IPR 2016-00905; May 9, 2016; 87 pages.

http://www.vrsim.net/history, downloaded Feb. 26, 2016.

Complaint for Patent Infringement in *Lincoln Electric Co. et al.* v. *Seabery Soluciones, S.L. et al.*, Case No. 1:15-av-01575-DCN, docket No. 1, filed Aug. 10, 2015, in the U.S. District Court for the Northern District of Ohio; 81 pages.

Kobayashi, Ishigame, and Kato, "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.

Wahi, Maxwell, and Reaugh, "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.

Declaration of Dr. Michael Zyda, May 3, 2016, exhibit to IPR 2016-00749.

Declaration of Edward Bohnert, Apr. 27, 2016, exhibit to IPR 2016-00749.

Swantec corporate web page downloaded Apr. 19, 2016. httpl/www.swantec.com/technology/numerical-simulation/.

Catalina, Stefanescu, Sen, and Kaukler, Interaction of Porosity with a Planar Solid/Liquid Interface (Catalina),), Metallurgical and Materials Transactions, vol. 35A, May 2004, pp. 1525-1538.

Fletcher Yoder Opinion re RE45398 and U.S. Appl. No. 14/589,317; including appendices; Sep. 9, 2015; 1700 pages.

Kobayashi, Ishigame, and Kato, "Skill Training System of Manual Arc Welding by Means of Face-Shield-Like HMD anti Virtual Electrode" ("Kobayashi 2003"), Entertainment Computing, vol. 112 of the International Federation for Information Processing (IFIP), Springer Science + Business Media, New York, copyright 2003, pp. 389-396.

(56) References Cited

OTHER PUBLICATIONS

G.E. Moore, No exponential is forever: but Forever can be delayed!: IEEE International Solid-State Circuits Conference, 2003. 19 pages.
"High Performance Computer Architectures—A Historical Perspective," downloaded May 5, 2016. http://homepages.inf.ed.ac.uk/cgi/mi/comparch. pl?Paru/perf.html,Paru/perf-f.html,Paru/menu-76.html; 3 pages.
Extended European Search Report from Corresponding Application No. EP19170154.9; dated Jul. 8, 2019; pp. 1-7.
Extended European Search Report from Corresponding Application No. EP19170017.8; dated Jul. 8, 2019; pp. 1-7.
Extended European Search Report from Corresponding Application No. EP19170161.4; dated Jul. 9, 2019; pp. 1-8.
SIMFOR / CESOL, "RV-SOLD" Welding Simulator, Technical and Functional Features, 20 pages, date unknown.
Weldplus, Welding Simulator, 2 pages, printed Jan. 14, 2015.
Robert Schoder, "Design and Implementation of a Video Sensor for Closed Loop Control of Back Bead Weld Puddle Width," Massachusetts, Institute of Technology, Dept. of Mechanical Engineering, May 27, 1983, 64 pages.
Hills and Steele, Jr.; "Data Parallel Algorithms", Communications of the ACM, Dec. 1986, vol. 29, No. 12, p. 1170.
Nancy C. Porter, J. Allan Cote, Timothy D. Gifford, and Wim Lam, Virtual Reality Welder Training, 29 pages, dated Jul. 14, 2006.
J.Y. (Yosh) Mantinband, Hillel Goldenberg, Llan Kleinberger, Paul Kleinberger, Autosteroscopic, field-sequential display with full freedom of movement OR Let the display were the shutter-glasses, 3ality (Israel) Ltd., 8 pages, 2002.
Fronius, ARS Electronica Linz Gmbh, High-speed video technology is applied to research on welding equipment,. and the results are visualized in the CAVE, 2 pages, May 18, 1997.
D.K. Aidun and S.A. Martin, "Penetration in Spot GTA Welds during Centrifugation," Journal of Material Engineering and Performance vol. 7(5), 4 pages, Oct. 1998—597.
Arc+ simulator; httl://www.123arc.com/en/depliant_ang.pdf; 2 pages, 2000.
Glen Wade, "Human uses of ultrasound: ancient and modern", Ulrasonics vol. 38, 5 pages, dated 2000.
ASME Definitions, Consumables, Welding Positions, 4 pages, dated Mar. 19, 2001. See http://www.gowelding.com/asme4.htm.
M. Abbas, F. Waeckel, Code Aster (Software) EDF (France), 14 pages, Oct. 2001.
Achim Mahrle, Jurgen Schmidt, "The influence of fluid flow phenomena on the laser beam welding process" International Journal of Heat and Fluid Flow 23, 10 pages, dated 2002.
The Lincoln Electric Company; Checkpoint Production Monitoring brochure; four (4) pages; http://www.lincolnelectric.com/assets/en_US/products/literature/s232.pdf; Publication S2.32; 4 pages, Issue Date Feb. 2012.
WeldWatch Software/Visible Welding; website printout; http://visiblewelding.com/weldwatch-software/; 4 pages; 2015.
Desroches, X.; Code-Aster, Note of use for aclculations of welding; Instruction manual U2.03 booklet: Thermomechincal; Document: U2.03.05; 13 pages, Oct. 1, 2003.
Fast, K. et al., "Virtual Training for Welding", Mixed and Augmented Reality, 2004, ISMAR 2004, Third IEEE and SM International Symposium on Arlington, VA, 2 pages, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric Mfg Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Abbas, M et al..; Code_Aster; Introduction to Code_Aster; User Manual; Booklet U1.0-: Introduction to Code_Aster; Document: U1.02.00; Version 7.4; 14 pages, Jul. 22, 2005.
Mavrikios D et al., A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.
Nancy C. Porter, Edison Welding Institute; J. Allan Cote, General Dynamics Electric Boat; Timothy D. Gifford, VRSim; and Wim Lam, FCS Controls; Virtual Reality Welder Trainer, Session 5: Joining Technologies for Naval Applications, 16 pages, earliest date Jul. 14, 2006.
T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.
Ratnam and Khalid: "Automatic classification of weld defects using simulated data and an MLP neutral network." Insight vol. 49, No. 3; 6 pages, Mar. 2007.
Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.
CS Wave, The Virtual Welding Trainer, 6 pages, 2007.
Asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 17 pages, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtually Welding, Training in a virtual environment gives welding students a leg up, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into The Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.
Choquet, Claude; "ARC+: Today's Virtual Reality Solution for Welders" Internet Page, 6 pages, Jan. 1, 2008.
Juan Vicenete Rosell Gonzales, "RV-Sold: simulator virtual para la formacion de soldadores"; Deformacion Metalica, Es. Vol 34, No. 301, 14 pages, Jan. 1, 2008.
White et al., Virtual welder training, 2009 IEEE Virtual Reality Conference, 1 page, p. 303, 2009.
Training in a virtual environment gives welding students a leg up, retrieved on Apr. 12, 2010 from: http://www.thefabricator.com/article/arcwelding/virtually-welding, 4 pages.
Sim Welder, Train better welders faster, retrieved on Apr. 12, 2010 from: http://www.simwelder.com.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/joumal/sensors; 2009; 18 pages; Sensors 2009, 9, 7753-7770; doi; 10.3390/s91007753.
Production Monitoring 2 brochure, four (4) pages, The Lincoln Electric Company, May 2009.
Bjorn G. Agren; Sensor Integration for Robotic Arc Welding; 1995; vol. 5604C of Dissertalions Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.

(56) References Cited

OTHER PUBLICATIONS

J. Hu and Hi Tsai, Heat and mass transfer in gas metal arc welding. Part 1: the arc, found in ScienceDirect, International Journal of Heat and Mass Transfer 50 (2007), 14 pages, 833-846, available online on Oct. 24, 2006 http://www.web.mst.edu/~tsai/publications/HU-IJHMT-2007-1-60.pdf.

M. Ian Graham, Texture Mapping, Carnegie Mellon University Class 15-462 Computer Graphics, Lecture 10, 53 pages, dated Feb. 13, 2003.

Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.

ViziTech USA, retrieved on Mar. 27, 2014 from http://vizitechusa.com/, 2 pages.

Guu and Rokhlin ,Technique for Simultaneous Real-Time Measurements of Weld Pool Surface Geometry and Arc Force. 10 pages, Dec. 1992.

William T. Reeves, "Particles Systems—A Technique for Modeling a Class of Fuzzy Objects", Computer Graphics 17:3 pp. 359-376, 1983, 17 pages.

S.B. Chen, L. Wu, Q. L. Wang and Y. C. Liu, Self-Learning Fuzzy Neural Networks and Computer Vision for Control of Pulsed GTAW, 9 pages, dated May 1997.

Patrick Rodjito, Position tracking and motion prediction using Fuzzy Logic, 81 pages, 2006, Colby College.

D'huart, Deat, and Lium; Virtual Environment for Training, 6th International Conference, ITS 20002, 6 pages, Jun. 2002.

Konstantinos Nasios (Bsc), Improving Chemical Plant Safety Training Using Virtual Reality, Thesis submitted to the University of Nottingham for the Degree of Doctor of Philosophy, 313 pages, Dec. 2001.

ANSI/AWS D 10 11 MID 10 11 :2007 Guide for Root Pass Welding of Pipe without Backing Edition: 3rd American Welding Society / Oct. 13, 2006/36 pages ISBN: 0871716445, 6 pages.

Ml. Jonsson, L. Karlsson, and L-E Lindgren, Simulation of Tack Welding Procedures in Butt Joint Welding of Plates Welding Research Supplement, Oct. 1985, 7 pages.

ISAAC Brana Veiga, Simulation of a Work Cell in the IGRIP Program, dated 2006, 50 pages.

Balijepalli, A. and Kesavadas, Haptic Interfaces for Virtual Environment and Teleoperator Systems, Haptics 2003, Department of Mechanical & Aerospace Engineering, State University of New York at Buffalo, NY.

Johannes Hirche, Alexander Ehlert, Stefan Guthe, Michael Doggett, Hardware Accelerated Per-Pixel Displacement Mapping, 8 pages.

Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages.

Steve Mann, Raymond Chun Bing Lo, Kalin Ovtcharov, Shixiang Gu, David Dai, Calvin Ngan, Tao Ai, Realtime HDR (High Dynamic Range) Video for Eyetap Wearable Computers, FPGA-Based Seeing Aids, and Glasseyes (EYETAPS), 2012 25th IEEE Canadian Conference on Electrical and Computer Engineering (CCECE), pp. 1-6, 6 pages, Apr. 29, 2012.

KYT Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.

Terrence O'Brien, "Google's Project Glass gets some more details",Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.

T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.

G. Wang, P.G. Huang, and Y.M. Zhang: "Numerical Analysis of Metal Transfer in Gas Metal Arc Welding" Departments of Mechanical Engineering; and Electrical and Computer Engineering, University of Kentucky, Lexington, KY 40506- 0108, 10 pages, Dec. 10, 2001.

Echtler et al., "The Intelligent Welding Gun: Augmented Reality for Experimental Vehicle Construction," Virtual and Augmented Reality Applications in Manufacturing (2003) pp. 1-27.

Teeravarunyou et al., "Computer Based Welding Training System," International Journal of Industrial Engineering (2009) 16(2): 116-125.

Antonelli et al., "A Semi-Automated Welding Station Exploiting Human-Robot Interaction," Advanced Manufacturing Systems and Technology (2011) pp. 249-260.

Praxair Technology Inc, "The RealWeld Trainer System: Real Weld Training Under Real Conditions" Brochure (2013) 2 pages.

Xie et al., "A Real-Time Welding Training System Base on Virtual Reality," Wuhan Onew Technology Co., Lid, IEEE Virtual Reality Conference 2015, Mar. 23-27, Arles France, pp. 309-310.

Lincoln Global, Inc., "VRTEX 360: Virtual Reality Arc Welding Trainer" Brochure (2015) 4 pages.

Wuhan Onew Technology Co Ltd, "ONEW-360 Welding Training Simulator" http://en.onewtech.com/_d276479751.htm as accessed on Jul. 10, 2015, 14 pages.

The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.

Miller Electric Mfg Co, "LiveArc: Welding Performance Management System" Owner's Manual, (Jul. 2014) 64 pages.

Miller Electric Mfg Co, "LiveArc Welding Performance Management System" Brochure, (Dec. 2014) 4 pages.

Bargteil et al., "A Texture Synthesis Method for Liquid Animations," Eurographics/ ACM SIGGRAPH Symposium on Computer Animation, 2006, pp. 345-351.

Aidun, Daryush K "Influence of simulated high-g on the weld size of Al-Li-Alloy" Acta Astronautica, vol. 48, No. 2-3, pp. 153-156, 2001.

Boss (engineering), Wikipedia, 1 page, printed Feb. 6, 2014.

CS Wave, Product Description, 2 pages, printed Jan. 14, 2015.

EnergynTech Inc.; website printout; http://www.energyntech.com /; Advanced Metals Processing Technology & Flexible Automation for Manufacturing; Virtual Welder; Virtual training system for beginning welders; 2 page; 2014.

EnergynTech Inc.; website printout; http://www.energyntech.com/Zipper.html; Zipper Robot Performing a HiDep Weld 1 page 2014.

Erden, "Skill Assistance with Robot for Manual Welding", Marie Curie Intra-European Fellowship, Project No. 297857, 3 pgs., printed Apr. 27, 2015.

EWM Virtual Welding Trainer, 2 pages, printed Jan. 14, 2015.

Fillet weld, Wikipedia, 3 pgs, printed Feb. 6, 2014.

Fronius, Virtual Welding, 8 pages, printed Jan. 14, 2015.

Fronius, Virtual Welding, The Welder Training of the Future, 8 page brochure, 2011.

The Goodheart-Wilcox Co., Inc., Weld Joints and Weld Types, Chaper 6; pp. 57-68; date unknown.

Kemppi ProTrainer, product data, 3 pages, printed Jan. 14, 2015.

Leap Motion, Inc., product information, copyright 2013, 14 pages.

Learning Labs, Inc., Seabery, Soldamatic Augmented Reality Welding Trainers, 4 pgs., printed Mar. 20, 2014.

Lim et al., "Automatic classification of weld defects using simulated data and MLP neural network", Insight, vol. 49, No. 3, Mar. 2007.

Narayan et al., "Computer Aided Design and Manufacturing," pp. 3-4, 14-15, 17-18, 92-95, and 99-100, Dec. 31, 2008.

NSRP—Virtual Welding—A Low Cost Virtual Reality Welder Training System—Phase II—Final Report; Feb. 29, 2012 Kenneth Fast, Jerry Jones, Valerie Rhoades; 53 pages.

Seabury Soluciones, SOLDAMATIC Welding Trainer Simulator, 30 pages, printed Jan. 14, 2015.

Terebes; Institute of Automation; University of Bremen; Project Motivation Problems Using Traditional Welding Masks; 2 page ; 2015.

Weld nut, Wikipedia, 2 pgs, printed Feb. 6, 2014.

(56) References Cited

OTHER PUBLICATIONS

Bargteil et al., "A Semi-Lagrangian Contouring Method for Fluid Simulation," ACM Transactions on Graphics, vol. 25, No. 1, Jan. 2006, pp. 19-38.

Chentanez et al., "Liquid Simulation on Lattice-Based Tetrahedral Meshes," Eurographics/ACM SIGGRAPH Symposium on Computer Animation (2007), 10 pages.

Chentanez et al., "Simultaneous Coupling of Fluids and Deformable Bodies," Eurographics/ ACM SIGGRAPH Symposium on Computer Animation, 2006, pp. 83-89.

Fujita et al., "Simulation Teaching Materials for the Mastery of Advanced Skills in Welding Torch Operation," IEICE Technical Report vol. 104, No. 48, Institute of Electronics, Information and Communication Engineers (IEICE), May 7, 2004.

Andreas Grahn, "Interactive Simulation of Contrast Fluid using Smoothed Particle Hydrodynamics," Jan. 1, 2008, Masters Thesis in Computing Science, Umea University, Department of Computing Science, Umea Sweden; 69 pages.

Marcus Vestedund, "Simulation and Rendering of a Viscous Fluid using Smoothed Particle Hydrodynamics," Dec. 3, 2004, Master's Thesis in Computing Science, Umea University, Department of Computing Science, Umea Sweden; 46 pages.

M. Muller et al., "Point Based Animation of Elastic, Plastic and Melting Objects," Eurographics/ACM SIGGRAPH Symposium on Computer Animation (2004); 11 pages.

Andrew Nealen, "Point-Based Animation of Elastic, Plastic, and Melting Objects," CG topics, Feb. 2005; 2 pages.

D. Tonnesen, Modeling Liquids and Solids using Thermal Particles, Proceedings of Graphics Interface'91, pp. 255-262, Calgary, Alberta, 1991.

DUDA Programming Guide Version 1.1, Nov. 29, 2007, 143 pages.

Websters II new college dictionary, 3rd ed., Houghton Mifflin Co., copyright 2005, Boston, MA, p. 1271, definition of Wake, 3 pages.

Da Daito L. et al. "CS Wave: Learning welding motion in a virtual environment" Published in Proceedings of the IIW International Conference, Jul. 10-11, 2008; 19 pages.

CS Wave-Manual, "Virtual Welding Workbench User Manual 3.0" 2007; 25 pages.

Choquet, Claude. "ARC+®: Today's Virtual Reality Solution for Welders", Published in Proceedings of the IIW International Conference; Jul. 10-11, 2008; 19 pages.

Welding Handbook, Welding Science & Technology, American Welding Society, Ninth Ed., Copyright 2001. Appendix A "Terms and Definitions" 54 pages.

Virtual Welding: A Low Cost Virtual Reality Welder Training System, NSRP RA 07-01—BRP Oral Review Meeting in Charleston, SC at ATI, Mar. 2008; 6 pages.

Dorin AITEANU, "Virtual and Augmented Reality Supervisor for A New Welding Helmet Dissertation," Nov. 15, 2005; 154 pages.

Screen Shot of CS Wave Exercise 135.FWPG Root Pass Level 1 https://web.archive.org/web/20081128081858/http:/wave.c-s.fr/images/english/snap_evolution2.Jpg; 1 page.

Screen Shot of CS Wave Control Centre V3.0.0 https://web.archive.org/web/20081128081915/http:/wave.c-s.fr/images/english/snap_evolution4.jpg; 1 page.

Screen Shot of CS Wave Control Centre V3.0.0 https://web.archive.org/web/20081128081817/http:/wave.c-s.fr/images/english/snap_evolution6.jpg; 1 page.

Da Daito L et al. "CS Wave A Virtual learning tool for the welding motion," Mar. 14, 2008; 10 pages.

Nordruch, Stefan et al. "Visual Online Monitoring of PGMAW Without a Lighting Unit", Jan. 2005; 14 pages.

The Evolution of Computer Graphics; Tony Tamasi, NVIDIA, 2008; 36 pages.

VRSim Powering Virtual Reality, www.lincolnelectric.com/en-us/eguipment/training-eguipment/Pages/powered-by-'rsim.aspx, 2016, 1 page.

Hillers, B.; Graser, A. "Direct welding arc observation without harsh flicker," 8 pages, allegedly FABTECH International and AWS welding show, 2007.

Declaration of Dr. Michael Zyda, May 3, 2016, exhibit to IPR 2016-00905; 72 pages.

Declaration of Edward Bohnart, Apr. 27, 2016, exhibit to IPR 2016-00905; 23 pages.

Declaration of Dr. Michael Zyda, May 3, 2016, exhibit to IPR 2016-00904; 76 pages.

Declaration of Edward Bohnart, Apr. 27, 2016, exhibit to IPR 2016-00904; 22 pages.

Declaration of Axel Graeser, Apr. 17, 2016, exhibit to IPR 2016-00840; 88 pages.

Adams et., "Adaptively Sampled Particle Fluids," ACM Transactions on Graphics, vol. 26, No. 3, Article 48, Jul. 2007, pp. 48.1-48.7.

ARC+—Archived Press Release from WayBack Machine from Jan. 31, 2008-Apr. 22, 2013, Page, https://web.3rchive.org/web/20121006041803/http://www.123certification.com/en/article_press/index.htm, Jan. 21, 2016, 3 pages.

P. Tschirner et al., Virtual and Augmented Reality for Quality Improvement of Manual Welds National Institute of Standards and Technology, Jan. 2002, Publication 973, 24 pages.

Y. Wang et al., "Impingement of Filler Droplets and Weld Pool During Gas Metal Arc Welding Process" International Journal of Heat and Mass Transfer, Sep. 1999, 14 pages.

Larry Jeffus, "Welding Principles and Applications," Sixth Edition, 2008, 10 pages.

R.J. Renwick et al., "Experimental Investigation of GTA Weld Pool Oscillations," Welding Research—Supplement to the Welding Journal, Feb. 1983, 7 pages.

Matt Phar, "GPU Gems 2 Programming Techniques for High-Performance Graphics and General-Purpose Computation," 2005, 12 pages.

Yaoming, "Applications of Microcomputer in Robot Technology," Scientific and Technical Documentation Press, Sep. 1987, pp. 360-365.

Thurey et al., "Real-time Breaking Waves for Shallow Water Simulations," Proceedings of the Pacific Conference on Computer Graphics and Applications, Maui, Hawaii, Oct. 29-Nov. 2, 2007, 8 pages.

Stam, "Stable Fluids," SIGGRAPH 99 Conference Proceedings, Annual Conference Series, Aug. 1999, 121-128.

Rasmussen et al., "Directable Photorealistic Liquids," Eurographics/ACM SIGGRAPH Symposium on Computer Animation (2004), pp. 193-202.

Premoze et al., "Particle-Based Simulation of Fluids," EUROGRAPHICS, vol. 22, No. 3 (2003), 10 pages.

O'Brien et al., "Dynamic Simulation of Splashing Fluids," Proceedings of Computer Animation '95, Apr. 19-21, 1995, in Geneva, Switzerland, pp. 198-205.

Muller et al., "Particle-Based Fluid Simulation for Interactive Applications," Eurographics/SIGGRAPH Symposium on Computer Animation (2003), pp. 154-159 and 372.

Klinger et al., "Fluid Animation with Dynamic Meshes," Computer Graphics Proceedings, Annual Conference Series, Jul. 30-Aug. 3, 2006, 820-825.

Kass et al., "Rapid, Stable Fluid Dynamics for Computer Graphics," Computer Graphics, vol. 24, No. 4, Aug. 1990, pp. 49-57.

Irving et al., "Efficient Simulation of Large Bodies of Water by Coupling Two and ThreeDimensional Techniques," ACM Transactions on Graphics (TOG), vol. 25, Issue 3, Jul. 2006, pp. 805-811.

Holmberg et al., "Efficient Modeling and Rendering of Turbulent Water over Natural Terrain," Proceedings of the 2nd International conference on Computer graphics and interactive techniques in Australasia and South East Asia, Singapore, Jun. 15-18, 2004, pp. 15-22.

Goktekin et al., "A Method for Animating Viscoelastic Fluids," Computer Graphics Proceedings, Annual Conference Series, Aug. 8-12, 2004, pp. 1-6.

Foster et al., "Realistic Animation of Liquids," Graphical Models and Image Processing, vol. 58, No. 5, Sep. 1996, pp. 471-483.

Foster et al., "Practical Animation of Liquids," ACM SIGGRAPH, Aug. 12-17, 2001, Los Angeles, CA, pp. 23-30.

(56) References Cited

OTHER PUBLICATIONS

Feldman et al., "Fluids in Deforming Meshes," Eurographics/ACM SIGGRAPH Symposium on Computer Animation (2005), pp. 255-259.
Feldman et al., "Animating Suspended Particle Explosions," Computer Graphics Proceedings, Annual Conference Series, Jul. 27-31, 2003, pp. 1-8.
Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.
Communication pursuant to Article 94(3) EPC from EP Application No. 19170017.8 dated Apr. 1, 2021.
Communication pursuant to Article 94(3) EPC from EP Application No. 19170161.4 dated Apr. 1, 2021.
Communication pursuant to Article 94(3) EPC from EP Application No. 19170585.4 dated Apr. 14, 2021.
Office Action from U.S. Appl. No. 16/366,324 dated Mar. 26, 2021.
Office Action from U.S. Appl. No. 16/366,300 dated Mar. 26, 2021.
Office Action from U.S. Appl. No. 16/366,275 dated Sep. 3, 2021.
Office Action from U.S. Appl. No. 16/366,324 dated Sep. 28, 2021.
Office Action from U.S. Appl. No. 16/366,300 dated Oct. 1, 2021.
Office Action from U.S. Appl. No. 16/366,275 dated Mar. 4, 2022.
Office Action from CN Application No. 201910308278.8 dated Mar. 1, 2022.
Office Action from CN Application No. 201910308996.5 dated Mar. 3, 2022.
Office Action from CN Application No. 201910308188.9 dated Mar. 16, 2022.
Office Action from U.S. Appl. No. 16/366,300 dated May 10, 2022.
Office Action from CN Application No. 201910308996.5 dated Sep. 20, 2022.
Office Action from CN Application No. 201910308278.8 dated Sep. 23, 2022.
Office Action from EP Application No. 19170154.9 dated Oct. 5, 2022.

* cited by examiner

Single-User Virtual Reality Welding Training System

| Description | QTY | |
|---|---|---|
| STAND BASE ASSEMBLY | 1 | |
| POST ASBLY | 1 | |
| MONITOR ARM ASBLY | 1 | Stand and Table |
| TABLE ASBLY | 1 | |
| COUPON SWING ARM ASBLY | 1 | |
| | | |
| SMAW DEVICE | 1 | |
| MIG GUN | 1 | |
| GTAW TORCH ASBLY | 1 | Devices |
| GTAW FILLER | 1 | |
| FOOT AMPTROL 12 PIN | 1 | |
| HELMET ENCLOSURE ASBLY | 1 | |
| | | |
| SINGLE USER MACHE ASBLY | 1 | |
| DIGITAL I/O MOTOR MODULE RIGHT | 1 | |
| AC INPUT MODULE RIGHT | 1 | |
| DC POWER MODULE RIGHT | 1 | VRTEX Machine (chassis) |
| CASE FRONT INTERFACE PANEL | 1 | |
| CASE BACK INTERFACE PANEL | 1 | |
| COMPUTER ASBLY | 1 | |

Fig. 6

Mobile Transport or Benchtop Virtual Reality Welding Training System

| Description | QTY | |
|---|---|---|
| COUPON BASE ASBLY | 1 | ⎫ |
| COUPON RISER STAND | 1 | ⎬ Stand and Table |
| SWING ARM SIXENSE | 1 | ⎬ |
| 22" TOUCH SCREEN MONITOR | 1 | ⎭ |
| | | |
| UNIGUN ASBLY | 1 | ⎫ |
| GTAW TORCH ASBLY | 1 | ⎬ |
| GTAW FILLER | 1 | ⎬ Devices |
| FOOT AMPTROL 12 PIN | 1 | ⎬ |
| HELMET ENCLOSURE ASBLY | 1 | ⎭ |
| | | |
| DUAL USER MACHINE ASBLY | 1 | ⎫ |
| DIGITAL I/O MOTOR MODULE RIGHT | 1 | ⎬ |
| AC INPUT MODULE RIGHT | 1 | ⎬ VRTEX Machine |
| DC POWER MODULE RIGHT | 1 | ⎬ (chassis) |
| CASE FRONT INTERFACE PANEL | 1 | ⎬ |
| CASE BACK INTERFACE PANEL | 1 | ⎬ |
| COMPUTER ASBLY | 1 | ⎭ |

Fig. 10

MODULAR AND RECONFIGURABLE CHASSIS FOR SIMULATED WELDING TRAINING

RELATED APPLICATIONS

The present application is being filed as a non-provisional patent application claiming priority under 35 U.S.C. § 119(e) from, and any other benefit of, U.S. Provisional Patent Application No. 62/659,729 filed on Apr. 19, 2018, the entire disclosure of which is herein incorporated by reference.

FIELD

The present invention pertains to systems for training welders using a simulated welding environment, and more particularly to system chassis that are modular and reconfigurable to allow for reduced inventory item counts and fewer part numbers to maintain in an inventory system, thus reducing production cost and long lead times due to parts shortages.

BACKGROUND

Until recently, welding was taught in a real-world setting, that is to say that welding was taught by using a real-world welding gun and pieces of metal that were positioned to form a weld joint that was the type of which the welding student was intended to learn. Instructors would often guide the student during the process of making the weld. This process required safety equipment, a suitable work environment, and consumed materials such as welding rod/wire, workpieces, and the electrical power consumed by the welding machine. Additionally, because of the arc and other dangers involved in real-world welds, instructors and other students were susceptible to injury from welding flash, sparks, and burns from hot workpieces.

Students learned by instruction and repetition, requiring potentially large numbers of workpieces and consumed materials. In more recent times, systems (simulators) have been employed that simulate a weld joint. These systems incorporate motion and position sensors that receive the position and motion of a mock welding tool (gun) and a simulated electrode carried by that tool. Example systems might incorporate the use of virtual reality (VR), which simulates a student's manipulation of a mock electrode and mock workpieces in a virtual setting. These systems track position and orientation of the mock electrode and mock workpieces. The use of this type of system enables the student to learn how to manipulate the welding tool (developing muscle memory).

In addition to VR, simulators can use other simulation techniques, such as augmented reality (AR). AR differs from VR in that AR generally provides the user with a view of a real-world workpiece with which a user is interacting. For example, an image may be captured by a camera and displayed in real-time to the user. Additional information is then added to this image. For example, in a simulated welding environment, a user may view two real-world workpieces and a simulated weld that appears as the user moves a mock electrode along a weld path, connecting the workpieces. Alternately, a user may view the real-world workpieces through a transparent display device that projects the additional information into the user's field of view.

Because this type of instruction is provided in many different types of locations and may be provided to students with varying needs, welding simulators should be flexible in both capabilities and physical structure. Known welding simulators generally provide different configurations that must be customized during the manufacturing process and typically require selecting a specific chassis based on the different configurations. In order to reduce inventory, manufacturing process complexity, and lead time, a modular and reconfigurable chassis is desirable.

Simulated welding training and welding simulators are known, such as described in: U.S. Pat. No. 8,747,116, filed on Jul. 10, 2009, issued on Jun. 10, 2015, and entitled System And Method Providing Arc Welding Training In A Real-Time Simulated Virtual Reality Environment Using Real-Time Weld Puddle Feedback; U.S. Pat. No. 9,483,959, filed on Jul. 17, 2009, issued on Nov. 1, 2016, and entitled Welding Simulator; and U.S. Pat. No. 9,011,154, filed on Feb. 2, 2012, issued on Apr. 21, 2015, and entitled Virtual Welding System; each of which is incorporated by reference herein in its entirety.

SUMMARY

In an exemplary embodiment, a welding simulator comprises a chassis having a predefined form factor (i.e., size and shape), the chassis being operable to interface with a plurality of external components including at least one mock welding tool and a helmet-mounted display. The welding simulator is configured into one of a first configuration, a second configuration, and a third configuration prior to use. The first configuration corresponds to the chassis including a first component, a second component, and a third component. The second configuration corresponds to the chassis including the first component, the second component, but not the third component. The third configuration corresponds to the chassis including the first component, but not the second or third components. The chassis of the first configuration, the chassis of the second configuration and the chassis of the third configuration are identical (i.e., have the same form factor).

At least one of the first configuration, the second configuration, and the third configuration is a mobile configuration.

At least one of the first configuration, the second configuration, and the third configuration is a single user configuration.

At least one of the first configuration, the second configuration, and the third configuration is a multi-user configuration.

In some exemplary embodiments, the welding simulator has a dual user configuration which supports two users simultaneously performing welding training in separate simulated environments.

In some exemplary embodiments, the welding simulator has a single user configuration which is limited to one user at a time performing welding training in a simulated environment.

In some exemplary embodiments, the welding simulator is configured such that the first component is an interface to a mock welding tool.

In some exemplary embodiments, the first configuration includes a first functionality not available in the second configuration.

In an exemplary embodiment, a welding simulator comprises a chassis having a predefined form factor (i.e., size and shape) the chassis being operable to interface with a plurality of external components including at least one mock welding tool and a helmet-mounted display. The chassis further comprises means for processing machine readable instructions to perform certain functions. The welding simulator is configured into one of a first configuration, a second configuration, and a third configuration prior to use. The first configuration corresponds to the chassis including a first component, a second component, and a third component. The second configuration corresponds to the chassis including the first component, the second component, a fourth component, but not the third component. The third configuration corresponds to the chassis including the first component, a fourth component, a fifth component, and not the second or third components. The chassis of the first configuration, the chassis of the second configuration and the chassis of the third configuration are identical (i.e., have the same form factor).

In some exemplary embodiments, the welding simulator is configured with at least one of the components being an interface to an external mock welding tool.

In some exemplary embodiments, the interface is adapted to receive an electronic signal from the mock welding tool wherein the welding simulator further comprises means for processing the electronic signal and generating a graphic representation of a welding tool corresponding to the mock welding tool.

In some exemplary embodiments, first configuration includes a first functionality not available in the second configuration.

In an exemplary embodiment, a welding simulator comprises a chassis operable to interface with a plurality of external components including at least one mock welding tool and a helmet-mounted display. The welding simulator is configured into one of a first configuration, a second configuration, and a third configuration prior to use. The first configuration corresponds to the chassis including a first component, a second component, and a third component. The second configuration corresponds to the chassis including a forth component, a fifth component, a sixth component and not the first, second, or third component. The third configuration corresponds to the chassis including the seventh component, an eighth component, a ninth component, and not the first, second, third, fourth, fifth or sixth components. The chassis of the first configuration, the chassis of the second configuration, and the chassis of the third configuration are identical (i.e., have the same size and shape).

In some exemplary embodiments, the welding simulator is configured such that at least one of the components is an interface to an external mock welding tool.

In some exemplary embodiments, the first configuration includes a first functionality not available in the second configuration.

In an exemplary embodiment, a method of producing a welding simulator comprises providing a chassis having a predefined form factor (i.e., size and shape), wherein the chassis has an interior cavity for housing a plurality of components and logic for executing machine readable instructions. In a first configuration of the chassis, the chassis houses a plurality of first components, and the logic executes first machine readable instructions to provide a first functionality. In a second configuration of the chassis, the chassis houses a plurality of second components, and the logic executes second machine readable instructions to provide a second functionality, but not the first functionality. In a third configuration of the chassis, the chassis houses a plurality of third components, and the logic executes third machine readable instructions to provide a third functionality, but not the first functionality or the second functionality. The method comprises selecting a chassis configuration from the first configuration, the second configuration, or the third configuration; installing in the chassis, one tool connection, if the first configuration is selected; installing in the chassis, one tool connection, if the second configuration is selected; and installing in the chassis, two tool connections, if the third configuration is selected.

In some exemplary embodiments, the method comprises installing a first digital input/output motor module, a first AC input module, and a first DC power module, if the first configuration is selected. In some exemplary embodiments, the method comprises, installing the first digital input/output motor module, the first AC input module, and the first DC power module, if the second configuration is selected. In some exemplary embodiments, the method comprises installing the first digital input/output motor module, a second digital input/output motor module, the first AC input module, a second AC input module, the first DC power module, and a second DC power module, if the third configuration is selected.

In some exemplary embodiments, the tool connection comprises a helmet display connection and a foot switch connection.

In some exemplary embodiments, the tool connection is adapted to receive an electronic signal from a mock welding tool connected to the tool connection, wherein the logic processes the electronic signal and generates a graphic representation of a welding tool corresponding to the mock welding tool.

The method further comprises providing a support having a predefined form factor when the second configuration is selected where the support comprises a second interior cavity and is adapted to attach to a bottom surface of the first chassis and installing support having a predefined form factor when the third configuration is selected, where the support comprises a second interior cavity and is adapted to attach to a bottom surface of the chassis.

In some exemplary embodiments, the method further comprises installing a first set of machine readable instructions that present a single user interface when executed by the logic, if the first configuration is selected; installing a second set of machine readable instruction that presents a single user interface when executed by the logic, if the second configuration is selected; and installing a third set of machine readable instructions that presents a dual user interface when executed by the logic, if the third configuration is selected.

An exemplary embodiment pertains to a reconfigurable mock welding tool that comprises a handle, a plurality of simulated attachable heads, a cable, and electrical connections to enable configuration signals and power to flow between the cable and components of the mock welding tool.

An exemplary embodiment pertains to a mock TIG filler metal device that comprises a filler metal, a sensor affixed to a first end of the filler metal, a sleeve configured to receive a second end of the filler metal and allow the filler metal to be positioned such that only a portion of the filler metal extends beyond the sleeve.

BRIEF DESCRIPTION OF THE DRAWINGS

These and other features of the general inventive concepts will become better understood with regard to the following description and accompanying drawings in which:

FIG. 6 is a chart of components used in the single user simulated welding system of FIG. 1;

FIG. 10 is a chart of components used in the mobile transport or benchtop simulated welding system of FIG. 9.

DETAILED DESCRIPTION

An exemplary embodiment comprises a simulated welding system which comprises a processor-based subsystem, a spatial tracker operatively connected to the processor-based subsystem, at least one mock welding tool capable of being spatially tracked by the spatial tracker, and at least one display device operatively connected to the programmable processor-based subsystem. The simulated welding system is capable of simulating, in a virtual reality space, operations associated with a real-world welding system. In an exemplary embodiment, these operations can include various different types of welds and non-welding operations. Generally, the simulated welding system may include any or all of the features and capabilities disclosed in the patents and patent applications incorporated by reference in full above.

Figure 1:
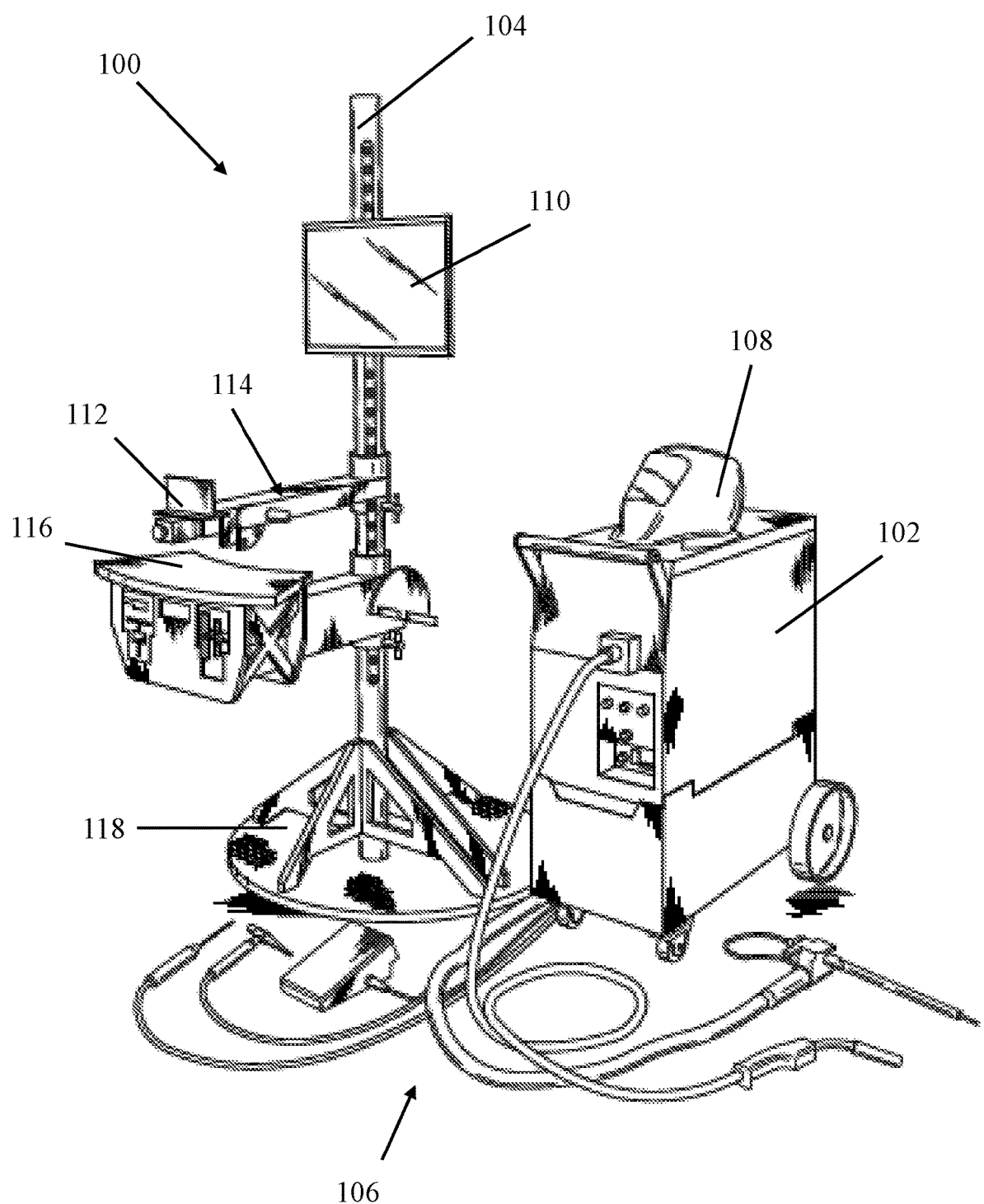
FIG. 1 is a diagram of a simulated welding system configured to support a single user according to an exemplary embodiment.

An exemplary embodiment of a simulated welding training system or simulator 100 is illustrated in FIG. 1. As shown, the system 100 comprises a chassis (also referred to as a console) 102, a welding stand 104, an at least one welding tool 106. A welding helmet 108 is also included in the exemplary system. The welding helmet 108 comprises a face mounted display device that provides images to a user as the user interacts with the simulated welding system 100. As illustrated, the welding stand 104 may comprise a display 110 that can be configured to replicate what is displayed in the face mounted display device and/or can provide an interface used to set up the simulated welding system, provide user performance data, or other user interface functions related to the system 100. The welding stand 104 may also comprise a workpiece holder 112, a position tracking system 114, a work surface (table) 116, and a base 118. The position tracking system 114 serves to track the position of the helmet 108, at least one welding tool 106, and in certain exemplary embodiments, the workpiece. Depending upon the configuration and training method (e.g., VR or AR), the workpiece may be a metal shape with the characteristics of a real workpiece. In other exemplary embodiments, a coupon may represent a real workpiece with the system generating an image that simulates a real workpiece for presentation to the user in the face mounted display device.

Figure 9:
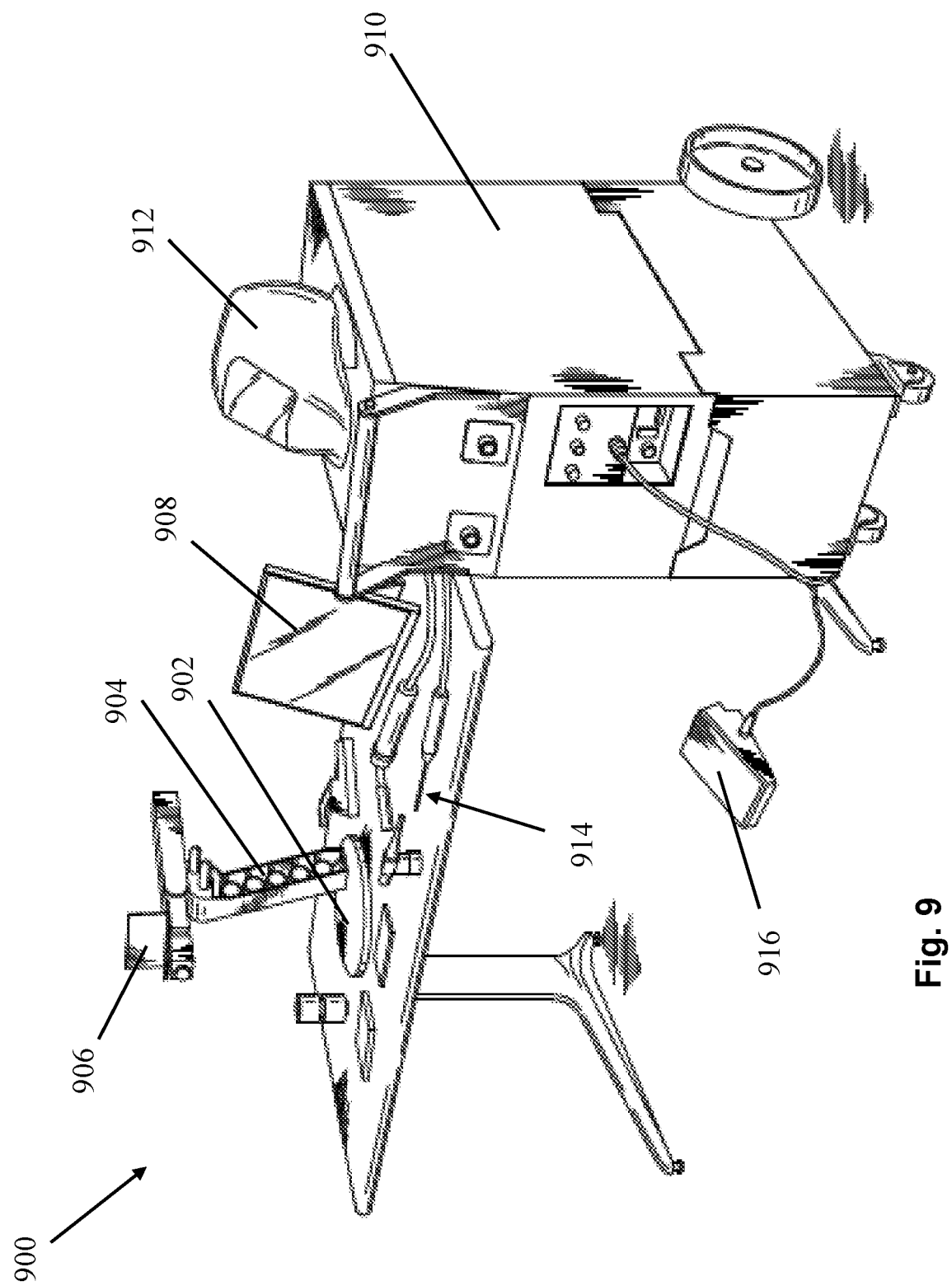
FIG. 9 is a diagram of a mobile transport or benchtop simulated welding system configured to support a single according to an exemplary embodiment.

In order to provide welding training to a variety of users who may have different training requirements, an exemplary welding training system may comprise a variety of different welding tools 106, welding stands 104, and displays 110 (and face mounted display devices). For example, see FIG. 1 and FIG. 7. Additionally, some exemplary embodiments may be configured in a desktop arrangement as shown in FIG. 9. As a result, the external devices that must connect and be supported by the chassis 102 can vary greatly from one welding training system to the next. Known chassis designs required dedicated arrangements to produce systems similar in capability as the system configurations illustrated in FIGS. 1, 7, and 9. In addition, dedicated interface components were often required for each connection made to the chassis 102. The result was that a number of different chassis configurations were required to produce the various welding training system arrangements. In order to produce these different arrangements in a timely manner, an inventory of different chassis configurations was required to be maintained.

Figure 2:
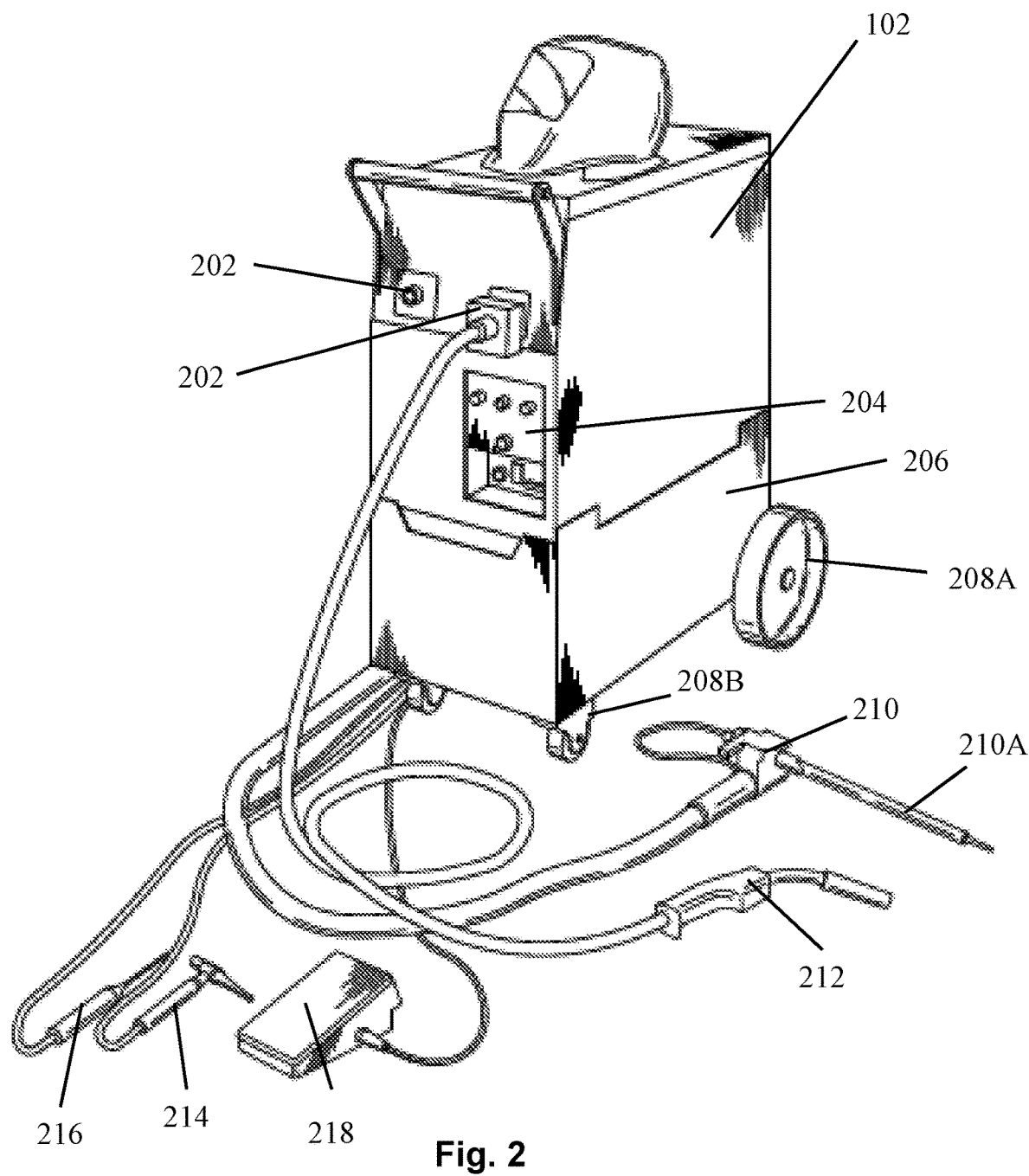
FIG. 2 is a diagram of a chassis and an assortment of mock welding tools connectable to the chassis according to an exemplary embodiment.

In an exemplary embodiment, a chassis with a predefined form factor (i.e., size and shape), is capable of being configured to interface with a plurality of external components. Such a chassis 102 along with a plurality of external components is illustrated in FIG. 2. As illustrated, the chassis 102 includes interface connections 202, a bay 204 for function modules, and an optional base section 206 that may be configured with wheels 208*a* and 208*b* to enable the chassis to easily be relocated.

Because there are multiple welding methods that can be employed (for example, stick welding, TIG welding, and MIG welding), welding training can involve multiple such methods and as a result, simulated welding training systems require the proper mock tools to simulate the various methods. As disclosed in the various incorporated herein, simulated welding training systems generate and display an image appropriate for the tool or tools based on the type of welding being trained. In order to provide a user with the sensation of welding that corresponds to what is being displayed by a simulated welding system, a mock welding tool is provided to the user. These mock welding tools have sensors or markers that are used by the position tracking system 114 to track the location and orientation of the mock welding tool. However, as illustrated, there are a number of different configurations needed. FIG. 2 illustrates mock welding tools such as a stick welding tool 210, a MIG welding tool 212, a TIG torch 214 and a TIG filler metal 216. Also illustrated is a foot pedal 218 that is used to control certain aspects of the welding process, such as, without limitation, the advancement of a wire electrode in a MIG welding tool 212.

As can be observed from FIG. 2, each of these mock welding tools has a different configuration. As would be understood by one of ordinary skill in the art, these mock welding tools represent real-world tools that also have different functionalities. For example, the stick welding tool 210 includes a simulated welding rod 210*a*. In a real-world welding operation, welding rods are consumable. In order to properly weld with a real-world stick welding tool, a user must be able to compensate for the consumption of the rod. Thus, to properly train the user in a simulated welding environment, the stick-welding tool must simulate the consumption of the welding rod. As a result, this mock welding tool as well as others that have similar functionalities require a control signal from a processor or other control device (processor) located in the chassis 102. To properly provide this control, the processor must be able to identify what sort of mock tool is connected to the chassis. In addition to providing the proper control signals to the mock welding tool, the processor must also identify the mock welding tool so as to provide the correct representation in the simulated environment created for the user. In an exemplary embodiment, the mock welding tool is connected to the chassis 102 with a cable. This cable serves to convey to the chassis 102 information that identifies the type of real-world tool that the mock welding tool represents. Thus, when the tool is connected to the chassis 102 via a connector 202, the processor receives the identifying information from the tool and causes the correct image to be created.

Figure 3:
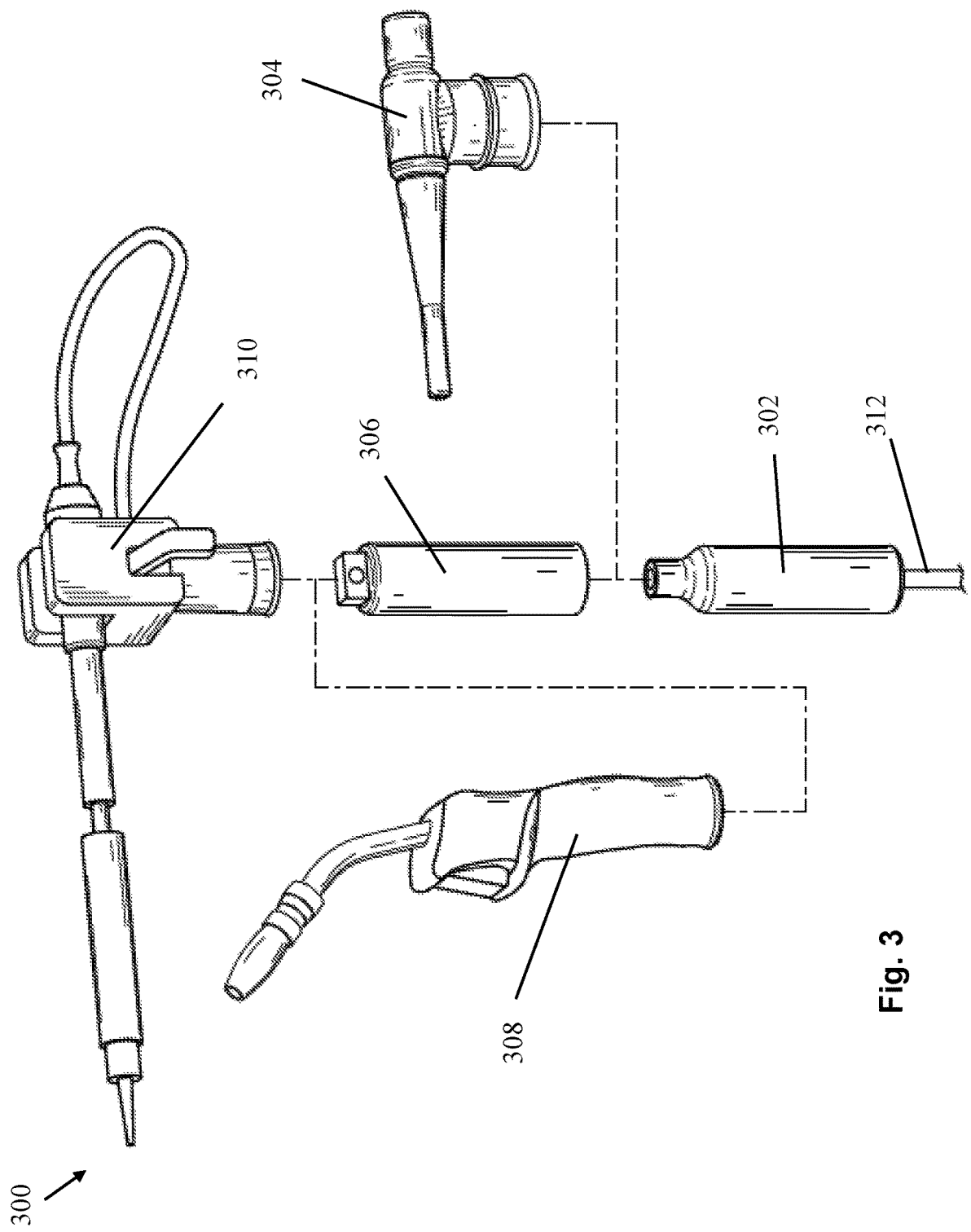
FIG. 3 is an exploded view diagram of a configurable mock welding tool according to an exemplary embodiment.

As noted above, a plurality of different tools may be connected to the chassis 102 including, but not limited to, a stick welding tool 210, a MIG welding tool 212, and a TIG torch 214. Instead of requiring a plurality of tools along with an associated plurality of cables and connectors, a configurable mock welding tool may be employed. In an exemplary embodiment, a configurable mock welding tool is adapted to be configurable to represent a plurality of different tool types. Such a configurable mock welding tool 300 is illustrated in FIG. 3, In one exemplary embodiment, a simulated TIG torch 304 serves as a baseline form factor. A handle 302 can be connected to the baseline TIG torch 304 to form a mock TIG torch similar to the dedicated TIG torch 214 of FIG. 2. A MIG form factor can be formed by connecting the handle 302, an extension 306, and a MIG tip 308. A stick welding tool can be formed by connecting the handle 302, the extension 306, and a stick welding head 310. In an exemplary embodiment, electrical contacts are embedded into the various components (handle 302, extension 306, and the TIG torch 304, MIG tip 308, or stick welding head 310) to allow the configuration to be communicated to the chassis 102 via the cable 312. In an exemplary embodiment, these contacts are located at the interface between a first and a second component (for example, at the interface between the handle 302 and the TIG torch 304). Thus, the processor (comprising a computer processor, memory, and storage) of the chassis 102 can detect the configuration of the configurable mock welding tool 300 and generate the correct image to display to a user.

In an exemplary embodiment of the configurable mock welding tool 300, the embedded electrical contacts can also serve to power and control actuators such as a motor that serves to simulate the consumption of the stick of the stick welding head 310 or retract a length of wire used to simulate the consumption of wire used in the MIG tip 308. For example, during a simulation, the processor may determine a rate of consumption of the simulated stick due to simulated welding activity and provide a control signal to the stick welding head 310 that causes the tip of the stick to be retracted towards a body of the stick welding head. This action, combined with a marker or other transmitter located at the end of the stick causes the processor to adjust the position of the tip displayed in a simulated welding environment as well adjust the simulated arc if the user does not compensate by moving the tip of the stick closer to a simulated workpiece.

Figure 4:
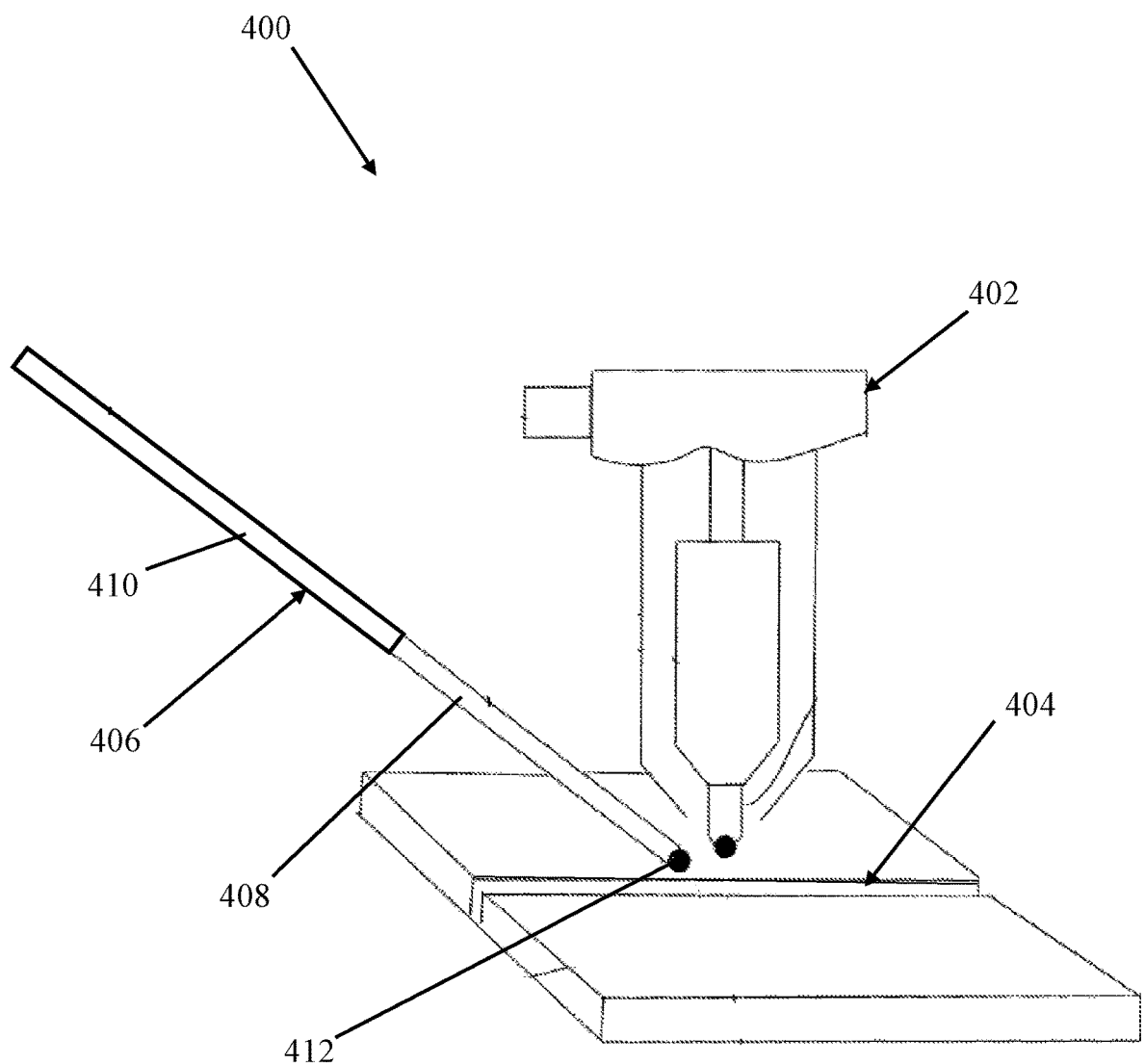
FIG. 4 is a diagram illustrating mock TIG filler wire and a cut-away view of a TIG torch according to an exemplary embodiment.

Like the consumption of the stick in stick welding and the wire in MIG welding, the TIG welding process also consumes a filler wire. As one of ordinary skill in the art will understand, TIG filler wire is ordinarily held in a user's hand and manually fed into the weld joint to fill the joint as needed. In order to enhance the simulation of the TIG welding process and thus the user's training, an exemplary embodiment includes a TIG filler wire that can be retracted away from the work surface as a TIG welding process is simulated. In one exemplary embodiment, a simulated metal wire for TIG welding could be telescoping or collapsible to simulate burn-away as the user moves the wire toward the workpiece. The user positions the end of the filler rod/wire at the sight of the simulated puddle on the simulated workpiece. The filler rod/wire is held in place within the sheath by friction until the user moves the sheath towards the workpiece (or the filler rod/wire can be telescoping or collapsible in another embodiment). The sheath slides over the filler rod/wire as the friction is overcome when the user moves the sheath towards the workpiece with the end of the filler rod/wire pressing against the workpiece at the site of the joint. When a simulated droplet is formed into the simulated puddle, the user can move the sheath back away from the workpiece slightly. The friction between the sheath and the filler wire will pull the tip of the filler wire away from the joint. The user can repeat this process, where the filler wire appears to get shorter over time (as the sheath is getting closer to the workpiece), simulating consumption of the filler wire in a TIG welding process. In an exemplary embodiment, a sensor is located on the simulated filler metal wire or sheath to provide feedback to the simulated welding simulator with respect to how far the wire has been retracted or compressed, indicating how much filler wire has been fed into the weld. A simulated TIG welding process 400 is illustrated in FIG. 4. As is shown, a mock TIG torch 402 is positioned above a joint 404 to be welded in workpiece. A user (not shown) positions a mock TIG filler wire 406 such that in a real-world weld, the filler would melt into the joint 404 to form the weld. In an exemplary embodiment, a wire (filler wire or rod) 408 is positioned within a sheath 410 of the mock TIG filler wire 406. As the user pushes the mock TIG filler wire 406 into the joint 404, the wire 408 is pushed back into the sheath 410, simulating the consumption of the mock TIG filler wire 406 by causing a sensor 412 located at the tip of the mock TIG filler wire 406 to move closer to the user's hand. In another exemplary embodiment, an actuator such as an electric motor can be disposed in the mock TIG filler wire 406. The actuator receives a signal from the controller located in the chassis 102 that causes the wire 408 to retract, moving the sensor 412 to move closer to the user's hand, simulating the consumption of the mock TIG filler wire 406.

Figure 5:
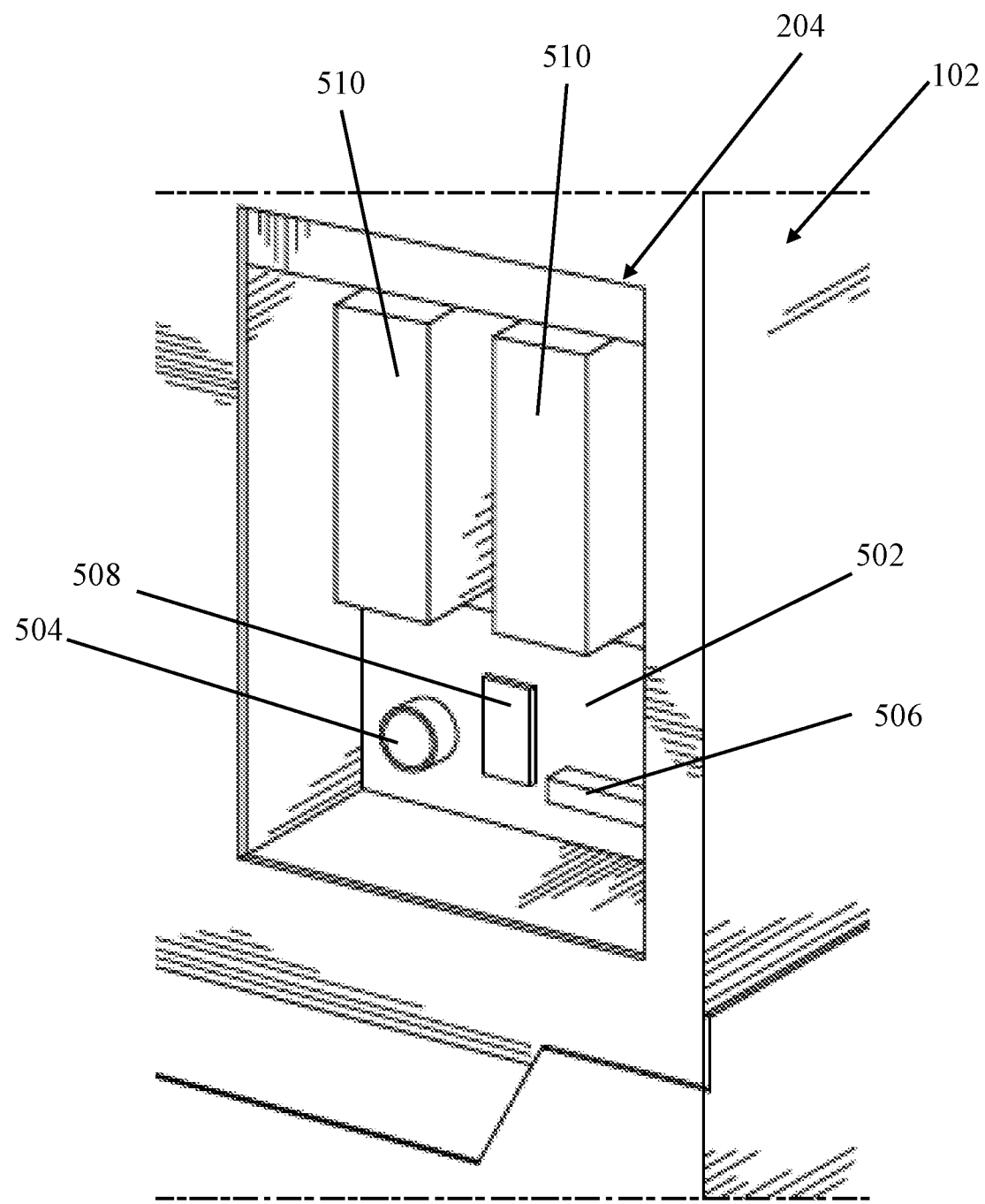
FIG. 5 is an illustration of a chassis bay of a configurable chassis used in a simulated welding system according to an exemplary embodiment.

In order to support the various configurations described herein, including the various tools 106, some of which may comprise actuators and/or electrical connections that communicate the tool type to the chassis, dedicated interface circuitry may be required. For example, certain mock welding tools would not ordinarily require control signals from the processor the chassis but may require power for a transmitter used by the position tracking system 114 to identify the location and orientation of the mock welding tool. Other tools, such as the MIG tip 308 described herein, may require power and control for an actuator in addition to a transmitter used by the position tracking system 114. Furthermore, as described herein, a simulated welding system may comprise a plurality of welding stands 102, position tracking systems 114, displays 110, and welding tools 106 to support one or more users simultaneously. As was illustrated at 204 in FIG. 2, a bay 204 may be included in the chassis 102 to support various modules required to interface and power tools 106, welding stands 102, displays 111, and other components used by the simulated welding system. FIG. 5 illustrates such a bay 204. A facia plate 502 is illustrated in the bay. Facia plates 502 may be configured to support interface connections 504, controls 506, and display devices 508 according to the needs of the simulated welding system as it may be configured. For example, a single user configuration may comprise interfaces and controls needed for a single user while a dual user configuration may comprise a second set of interfaces and controls needed to support the tools 106, welding stands 102, and displays needed by a second user. In addition to the facia plate, various modules 510 are used to provide control circuitry needed for a particular configuration. For example, a dual user configuration may require a second set of power supply circuits to power devices used by the second user. Thus, a module 510 that includes the second power supply may be added to the chassis 102 by being inserted into a receiving location provided by the bay 204.

In an exemplary embodiment, a simulated welding system 100 as illustrated in FIG. 1, is configured to only support one user at a time. In other words, the system 100 can support a single user interacting with the simulated welding system 100 at any one point in time. Such a system may be used to train a first user, and then when the first user is not interacting with the system, a second user may use the simulated welding system 100. As shown, a single welding stand 104, an assortment of welding tools 106, and a single welding helmet 108 are supported by the system 100 with this configuration of the chassis 102.

The illustrated welding stand 102 includes a display 110. In an exemplary embodiment, a user interacts with the display 110 to make changes to the simulated welding system settings, start training exercises, view scores and reports, and other user interface activity. In an exemplary embodiment, such changes can be made via the display using touch screen functionality. Additionally, a third-party (e.g., and instructor) can observe the performance of the user via the display 110.

In the single user configuration, the chassis 102 is configured to support one simulated (virtual reality) work site which includes the welding stand 104 and table 116, a display 110, and other accessories (such as a welding helmet 108, tools 106, cables, and welding coupons which represent workpieces). FIG. 6 illustrates an exemplary list of components of the single-user simulated welding system 100 of FIG. 1. The list includes components of the welding stand 104 and table 116, tools 106 and other devices, and the chassis 102. In a single user configuration, the chassis 102 is configured to include one digital I/O motor module, one AC input module, one DC power module, and one processor (computer assembly) to support one user. In such an exemplary embodiment, the digital I/O motor module controls a stick welding motor and includes hardware to interface the motor to the processor. The AC input module is configured to distribute AC input power within the chassis 102. The DC power module is configured to distribute DC power within the chassis 102. The processor includes a main computer providing the computing and simulation capability for the single worksite.

Figure 7:
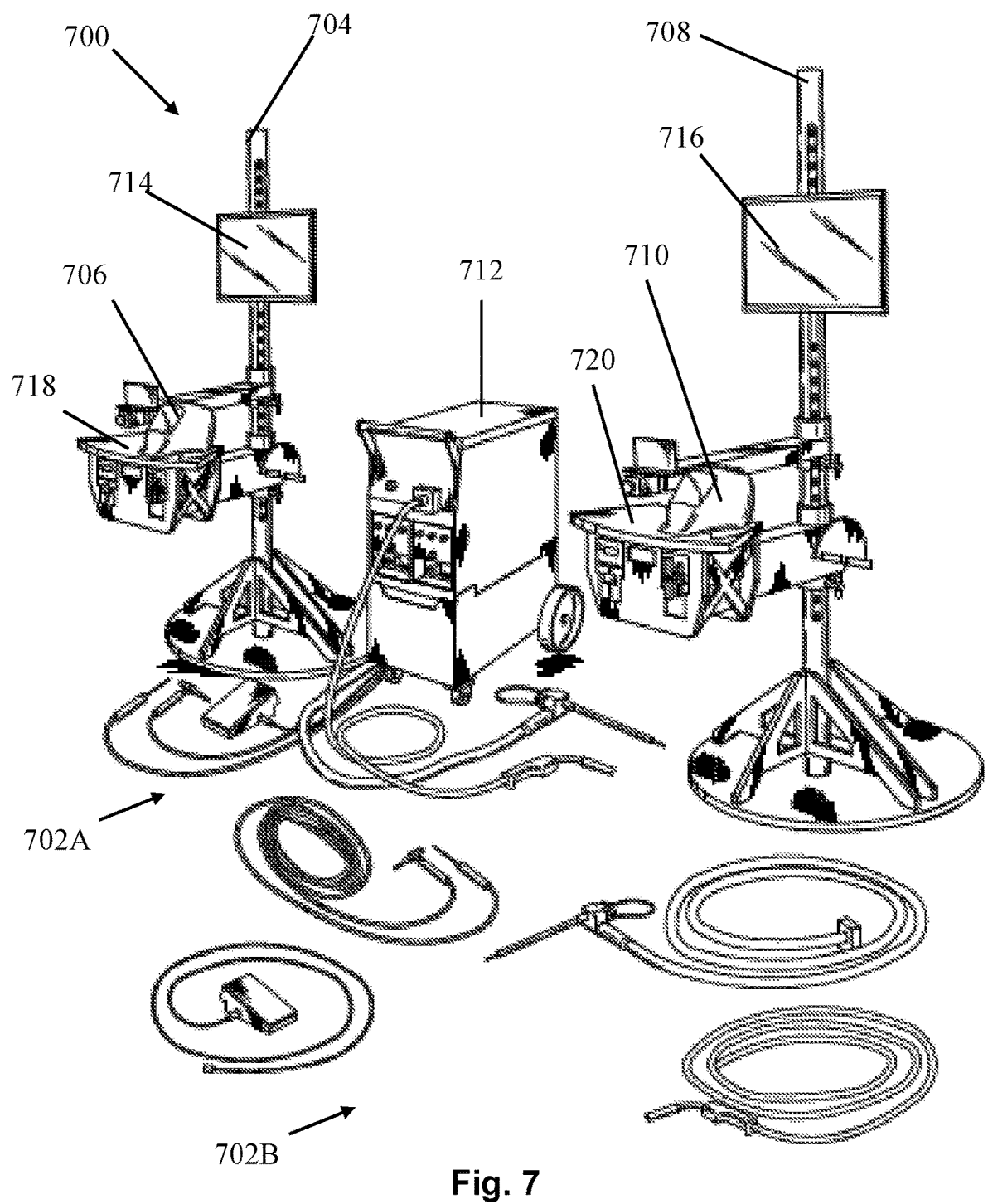
FIG. 7 is a diagram of a simulated welding system configured to support two users concurrently according to an exemplary embodiment.

In another exemplary embodiment, a simulated welding system 700 as illustrated in FIG. 7, is configured for a dual-users. In other words, the simulated welding system can support two users simultaneously interacting with the simulated welding system 700. Such a system may be used to train two users, where the first user and second user may be performing similar welding operations thus requiring each to have the same or a similar set of welding tools (702A and 702B). Such a system 700 may also support a different welding operation being performed by each user. In other words, the system 700 supports two different users performing welding training at the same time whether in discrete simulated environments or the same simulated environment. As shown, a first welding stand 704, a first assortment of welding tools 702A, a first welding helmet 706, a second welding stand 708, a second set of welding tools 702B, and a second welding helmet 710 are supported by a single chassis 712.

As shown, each welding stand (704 and 708) comprise a display 714 and 716 that allow two users to interact simultaneously with the simulated welding system 700 to make adjustments to settings or otherwise configure, initiate training, or view reports. In certain exemplary embodiments, these display (714 and 716) may be provided with touch screen functionality to facilitate use interaction.

Figure 8:
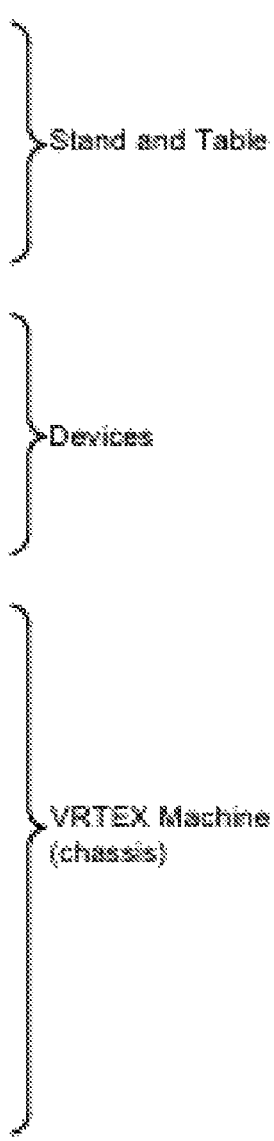
FIG. 8 is a chart of components used in the dual user simulated welding system of FIG. 7.

In the dual user configuration, the chassis supports 712 two simulated (virtual reality) work sites which each include a welding stand (704 and 708) and table (718 and 720), a display (714 and 716), a welding helmet (706 and 710) and other accessories (such as tools 702A and 702B, cables, welding coupons which represent workpieces). FIG. 8 illustrates an embodiment of a list of components of the dual-user simulated welding training system 700 of FIG. 7. FIG. 8 includes a listing of components of the welding stand and table, devices, and the chassis 712. In the embodiment illustrated in FIG. 6, the chassis is configured to include two digital I/O motor modules (right/left), two AC input modules (right/left), two DC power modules (right/left), and two processors to support two users. Each digital I/O motor module controls a stick welding motor and includes hardware to interface the motor to the computer. Each AC input module is configured to distribute AC input power within the chassis. Each DC power module is configured to distribute DC power within the chassis. Each processor includes a main computer providing the computing and simulation capability for one of the two worksites.

In another exemplary embodiment, a simulated welding system 900 as illustrated in FIG. 9, is configured for mobile transport or benchtop use. As shown simulated welding system 900 is configured to supporting one user. FIG. 9 also shows a coupon base assembly 902, a coupon riser stand 904, a swing arm 906, and a display 908 adjacent to the chassis 910. In this manner, a user can interact with the display 908 via a touch screen and therefore does not have to repeatedly access the chassis 910 to make changes to the simulated welding system 900 settings.

In the mobile transport or benchtop configuration illustrated, the chassis 910 supports one simulated (virtual reality) mobile transport or benchtop work site which includes a coupon riser stand 902 and 904, a swing arm 906, a display 908, a welding helmet 912 and other accessories (such as tools 914, cables, a foot pedal 916 and welding coupons which represent workpieces). FIG. 10 includes a listing of components of the mobile transport or benchtop simulated welding system 900 of FIG. 9. FIG. 10 lists the components of a benchtop stand and table, devices, and the chassis 910. In the illustrated exemplary embodiment, the chassis 910 is configured to include one digital I/O motor module, one AC input module, one DC power module, and one processor assembly to support one user. The digital I/O motor module controls a stick welding motor and includes hardware to interface the motor to the processor. The AC input module is configured to distribute AC input power within the chassis 910. The DC power module is configured to distribute DC power within the chassis 910. The processor assembly includes a main computer providing the computing and simulation capability for the mobile transport or benchtop worksite.

Thus, as illustrated by the listing of components in FIGS. 6, 8, and 10, a single chassis can be re-configured into one of three possible configurations. Many of the components of the three possible configurations are common to all three configurations, thus saving time and money while providing the possibility of three different configurations. For example, the digital I/O motor module, the AC input module, the DC power module, and the computer assembly are common to all three configurations. In summary, disclosed is modular and reconfigurable chassis for simulating welding training that supports multiple varieties of training systems, including, without limitation, single, dual and desktop arrangements. The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A welding simulator comprising:
a chassis having a predefined form factor, the chassis being operable to interface with a plurality of external components including at least one mock welding tool and a helmet-mounted display;
wherein the welding simulator is configured into one of a first configuration, a second configuration, and a third configuration prior to use;
wherein the first configuration is a multi-user configuration and corresponds to the chassis including a first component, a second component, and a third component, wherein the multi-user configuration supports two users simultaneously performing simulated welding in separate independent and different simulated welding environments;
wherein the second configuration is a single user configuration and corresponds to the chassis including the first component, the second component, and not the third component;
wherein the third configuration is a mobile configuration that corresponds to the chassis including the first component, and not the second or third components, and wherein, in the mobile configuration, the at least one mock welding tool includes a configurable mock welding tool comprising a handle and a plurality of interchangeable torches including a mock MIG torch, a mock TIG torch, and a mock stick welding head, wherein the handle is attached to the chassis via a cable, and each of the plurality of interchangeable torches includes electrical contacts that conduct a configuration signal to the chassis via the cable, wherein the configuration signal identifies one of the mock MIG torch, the mock TIG torch, and the mock stick welding head as being connected to the handle; and
wherein the chassis of the first configuration, the chassis of the second configuration and the chassis of the third configuration have the same form factor.

2. The welding simulator of claim 1, wherein the single user configuration is limited to one user at a time in a simulated environment.

3. The welding simulator of claim 1, wherein the first component is an interface to a mock welding tool.

4. The welding simulator of claim 1, wherein the first configuration includes a first functionality not available in the second configuration.

5. A welding simulator comprising:
a chassis having a predefined form factor, the chassis being operable to interface with a plurality of external components including at least one mock welding tool and a helmet-mounted display;
the chassis further comprising a means for processing machine readable instructions to perform certain functions;
wherein the welding simulator is configured into one of a first configuration, a second configuration, and a third configuration prior to use;
wherein the first configuration is a multi-user configuration and corresponds to the chassis including a first component, a second component, and a third component, wherein the multi-user configuration supports two users simultaneously performing simulated welding in separate independent and different simulated welding environments;
wherein the second configuration is a single user configuration and corresponds to the chassis including the first component, the second component, a fourth component, and not the third component;
wherein the third configuration is a mobile configuration that corresponds to the chassis including the first component, a fourth component, a fifth component, and not the second or third components, and wherein, in the mobile configuration, the at least one mock welding tool includes a configurable mock welding tool comprising a handle and a plurality of interchangeable torches including a mock MIG torch, a mock TIG torch, and a mock stick welding head, wherein the handle is attached to the chassis via a cable, and each of the plurality of interchangeable torches includes electrical contacts that conduct a configuration signal to the chassis via the cable, wherein the configuration signal identifies one of the mock MIG torch, the mock TIG torch, and the mock stick welding head as being connected to the handle; and
wherein the chassis of the first configuration, the chassis of the second configuration and the chassis of the third configuration have the same form factor.

6. The welding simulator of claim 5, wherein at least one of the components is an interface to an external mock welding tool.

7. The welding simulator of claim 6, wherein the interface is adapted to receive an electronic signal from the mock welding tool wherein the welding simulator further comprises a means for processing the electronic signal and generating a graphic representation of a welding tool corresponding to the mock welding tool.

8. The welding simulator of claim 5, wherein the first configuration includes a first functionality not available in the second configuration.

9. A method of producing a welding simulator, the method comprising:
providing a chassis having a predefined form factor, wherein the chassis has an interior cavity for housing a plurality of components and logic for executing machine readable instructions, wherein:
in a first configuration of the chassis, the chassis houses a plurality of first components and the logic executes first machine readable instructions to provide a first functionality, wherein the first configuration is a single user configuration;
in a second configuration of the chassis, the chassis houses a plurality of second components and the logic executes second machine readable instructions to provide a second functionality, wherein the second configuration is a mobile configuration, and wherein, in the mobile configuration, the welding simulator includes a configurable mock welding tool comprising a handle and a plurality of interchangeable torches including a mock MIG torch, a mock TIG torch, and a mock stick welding head, wherein the handle is attached to the chassis via a cable, and each of the plurality of interchangeable torches includes electrical contacts that conduct a configuration signal to the chassis via the cable, wherein the configuration signal identifies one of the mock MIG torch, the mock TIG torch, and the mock stick welding head as being connected to the handle;

in a third configuration of the chassis, the chassis houses a plurality of third components and the logic executes third machine readable instructions to provide a third functionality, wherein the third configuration is a multi-user configuration that supports two users simultaneously performing simulated welding in separate independent and different simulated welding environments;

selecting a chassis configuration from the first configuration, the second configuration, or the third configuration;

installing in the chassis, one tool connection if the first configuration is selected;

installing in the chassis, one tool connection if the second configuration is selected; and installing in the chassis, two tool connections if the third configuration is selected.

10. The method of claim 9, further comprising:

installing one digital input/output motor module, one AC input module, and one DC power module if the first configuration is selected;

installing one digital input/output motor module, one AC input module, and one DC power module if the second configuration is selected; and installing two digital input/output motor modules, two AC input modules, and two DC power modules if the third configuration is selected, wherein each of the AC input modules is configured to distribute AC input power within the chassis.

11. The method of claim 9, wherein the tool connection comprises a helmet display connection and a foot switch connection.

12. The method of claim 9, wherein the tool connection is adapted to receive an electronic signal from a mock welding tool connected to the tool connection and wherein the logic processes the electronic signal and generates a graphic representation of a welding tool corresponding to the mock welding tool.

13. The method of claim 9, further comprising the steps of:

installing a first set of machine-readable instructions in the chassis that present a single user interface when executed by the logic if the first configuration is selected;

installing a second set of machine-readable instructions in the chassis that present a single user interface when executed by the logic if the second configuration is selected; and installing a third set of machine-readable instructions in the chassis that present a dual user interface when executed by the logic if the third configuration is selected.

\* \* \* \* \*